US008800612B2

(12) United States Patent  (10) Patent No.: US 8,800,612 B2
Saito et al.  (45) Date of Patent: Aug. 12, 2014

(54) CONTAINER AND PACKAGE USING THE SAME

(75) Inventors: Takeshi Saito, Tokyo (JP); Noriyuki Sasaki, Tokyo (JP); Masashi Goto, Tokyo (JP); Takashi Terayama, Tokyo (JP); Daiji Takeuchi, Tokyo (JP); Toyoaki Naito, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 877 days.

(21) Appl. No.: 12/736,597

(22) PCT Filed: Apr. 24, 2009

(86) PCT No.: PCT/JP2009/001902
§ 371 (c)(1),
(2), (4) Date: Oct. 21, 2010

(87) PCT Pub. No.: WO2009/130916
PCT Pub. Date: Oct. 29, 2009

(65) Prior Publication Data
US 2011/0036454 A1 Feb. 17, 2011

(30) Foreign Application Priority Data

Apr. 24, 2008 (JP) .................................. 2008-114574
Apr. 24, 2008 (JP) .................................. 2008-114576

(51) Int. Cl.
*B65D 51/18* (2006.01)
*B65D 39/00* (2006.01)
*B65D 77/20* (2006.01)
*B65D 77/24* (2006.01)
*B65D 25/42* (2006.01)
*B65D 17/00* (2006.01)
*B65D 8/00* (2006.01)
*B65D 43/02* (2006.01)
*B65D 83/06* (2006.01)

(52) U.S. Cl.
CPC ...... *B65D 51/18* (2013.01); *B65D 2543/00638* (2013.01); *B65D 39/007* (2013.01); *B65D 2543/00685* (2013.01); *B65D 2543/00537* (2013.01); *B65D 77/2056* (2013.01); *B65D 2577/2091* (2013.01); *B65D 2543/00296* (2013.01); *B65D 77/24* (2013.01); *B65D 2251/0093* (2013.01); *B65D 25/42* (2013.01); *B65D 2543/0074* (2013.01); *B65D 17/161* (2013.01); *B65D 2543/00796* (2013.01); *B65D 15/02* (2013.01); *B65D 43/0212* (2013.01); *B65D 2251/0018* (2013.01); *B65D 2543/00092* (2013.01); *B65D 83/06* (2013.01)
USPC ........... 141/352; 141/363; 141/365; 141/366; 222/462; 222/566; 222/572; 222/541.2

(58) Field of Classification Search
CPC .............. B67C 2011/20; B65D 88/26; B65D 81/3211; B65D 51/20; B65D 2231/007; A61J 1/2089; A61J 1/1406
USPC ......... 141/329, 331, 332, 335, 352, 363, 365, 141/366, 18; 222/460–462, 566, 572, 222/541.2, 1; 99/289 R
See application file for complete search history.

(56) References Cited

U.S. PATENT DOCUMENTS

| 203,847 | A | * | 5/1878 | More ............................ 210/477 |
| 3,171,449 | A | * | 3/1965 | Ellms et al. ................... 141/330 |
| 3,446,403 | A | * | 5/1969 | Serio et al. .................... 222/158 |
| 4,105,142 | A | * | 8/1978 | Morris, Jr. ..................... 222/158 |
| 4,149,454 | A | * | 4/1979 | Kemp ............................ 99/295 |
| 4,307,990 | A | * | 12/1981 | Carlsson ....................... 414/412 |
| 5,857,504 | A | * | 1/1999 | Tremblay ...................... 141/338 |
| 5,871,110 | A | * | 2/1999 | Grimard et al. ............... 215/249 |
| 5,967,201 | A | * | 10/1999 | Gasior ........................... 141/98 |
| 5,979,516 | A | * | 11/1999 | Grant ............................ 141/331 |
| 6,237,649 | B1 | * | 5/2001 | Moisio et al. ................. 141/100 |
| 6,263,928 | B1 | * | 7/2001 | Woodruff ...................... 141/346 |
| 6,994,129 | B2 | * | 2/2006 | Fesko ........................... 141/330 |
| 7,207,360 | B2 | * | 4/2007 | Vargas .......................... 141/322 |
| 7,210,508 | B2 | * | 5/2007 | Behar ........................... 141/329 |
| 7,308,915 | B2 | * | 12/2007 | Johns et al. ................... 141/100 |
| 7,607,460 | B2 | * | 10/2009 | Johns et al. ................... 141/329 |
| 7,886,779 | B2 | * | 2/2011 | Smith ............................ 141/23 |
| 8,025,653 | B2 | * | 9/2011 | Capitaine et al. ............. 604/411 |
| 8,474,495 | B2 | * | 7/2013 | Singleton et al. ............. 141/330 |

| | | | |
|---|---|---|---|
| 8,505,590 B2* | 8/2013 | Kernkamp et al. | 141/18 |
| 2002/0134801 A1* | 9/2002 | Stewart | 222/541.4 |
| 2006/0237095 A1 | 10/2006 | Johns et al. | |
| 2008/0015539 A1* | 1/2008 | Pieroni et al. | 604/403 |
| 2009/0120528 A1* | 5/2009 | Fisher et al. | 141/1 |
| 2009/0308889 A1* | 12/2009 | Lindsay et al. | 222/129 |
| 2010/0186597 A1* | 7/2010 | Kernkamp et al. | 99/289 R |
| 2013/0032565 A1* | 2/2013 | Fox | 215/247 |

FOREIGN PATENT DOCUMENTS

| | | |
|---|---|---|
| CN | 2748390 Y | 12/2005 |
| EP | 2 008 553 A1 | 12/2008 |
| FR | 2666566 | 11/1995 |
| JP | 55-80248 | 6/1980 |
| JP | 57-184952 | 11/1982 |
| JP | 60-101465 | 7/1985 |
| JP | 63-24464 | 5/1988 |
| JP | 1-182263 | 7/1989 |
| JP | 1-267167 | 10/1989 |
| JP | 3-275478 | 12/1991 |
| JP | 3010992 | 5/1995 |
| JP | 8-58764 | 3/1996 |
| JP | 8-198311 | 8/1996 |
| JP | 8-301325 | 11/1996 |
| JP | 9-39998 | 2/1997 |
| JP | 9-110077 | 4/1997 |
| JP | 9-286460 | 11/1997 |
| JP | 10-203542 | 8/1998 |
| JP | 2000-238814 | 9/2000 |
| JP | 2002-179106 | 6/2002 |
| JP | 2002-264918 | 9/2002 |
| JP | 2003-72813 | 3/2003 |
| JP | 2004-189264 | 7/2004 |
| JP | 2004-210298 | 7/2004 |
| JP | 2004-261028 | 9/2004 |
| JP | 2004-291982 | 10/2004 |
| JP | 2004-331081 | 11/2004 |
| JP | 2006-160322 | 6/2006 |
| JP | 2007-50895 | 3/2007 |
| JP | 2007-54023 | 3/2007 |
| JP | 2007-131323 | 5/2007 |
| JP | 2007-320582 | 12/2007 |
| JP | 2008-201437 | 9/2008 |
| JP | 2009-7067 | 1/2009 |
| JP | 2009-7072 | 1/2009 |
| WO | WO 03/101859 A1 | 12/2003 |

OTHER PUBLICATIONS

International Search Report for PCT/JP2009/001902, mailed May 26, 2009.

Chinese Office Action issued Nov. 22, 2011 issued in corresponding Chinese Patent Application No. 200980114081.5.

European Search Report dated May 24, 2011 in corresponding European Patent Application 09735686.9.

Australian Office Action issued Jul. 1, 2013 in corresponding Australian Application No. 2009239251.

Office Action issued by the Canadian Intellectual Property Office on Mar. 25, 2014 in the corresponding Canadian patent application No. 2,722,070.

Office Action issued by the Japanese Patent Office on Jan. 24, 2014 in the corresponding Japanese patent application No. 2009-104375.

* cited by examiner

*Primary Examiner* — Timothy L Maust
(74) *Attorney, Agent, or Firm* — Staas & Halsey LLP

(57) ABSTRACT

A container is provided that is used as a container permitting easy transfer into another container without spilling of contents at the time of work of refilling. The present invention relates to a container that is fitted in a container body of tubular shape having an open end, a bottom part and a side wall and that transfers contents into a preservation container. This container has: a funnel component (201) provided with a funnel (220) whose diameter decreases from a larger opening side toward a smaller opening side and provided with a plurality of ribs (228) that extend radially from the center of an opening part (222) on the smaller opening side of the funnel (220) so as to bridge a part with another part of the inner surface of the opening part (222) on the smaller opening side; and a container body.

7 Claims, 24 Drawing Sheets

CONTAINER AND PACKAGE USING THE SAME

TECHNICAL FIELD

The present invention relates to a container and a package using the same, and in particular to: a container used for packing material of powdered, granular, or liquid form and transferring the contents into another container; and a package using the same.

BACKGROUND ART

Powdered food such as instant coffee is sold in general in a state of being contained in a container having a high sealing property like a bottle with cap that maintains a sealing property during preservation. Further, for the purpose of reusing the preservation container after refilling it with contents, a refilling use package is also known that packs contents simply. As a container for this refilling use package, for example, a pouch, a gadget bag and a cup-shaped container are used.

Further, Patent Documents 1 to 3 describe configurations that in order to reinforce a cup container fabricated from paper that has a light weight and can easily be discarded, a reinforcing ring fabricated from resin is attached to the opening part of the cup container.

CITATION LIST

Patent Literature

[PTL 1] Japanese Laid-Open Patent Publication No. S63-24464
[PTL 2] Japanese Laid-Open Patent Publication No. H8-58764
[PTL 3] Japanese Laid-Open Patent Publication No. 2002-264918
[PTL 4] Japanese Patent Publication No. 2895556
[PTL 5] Japanese Laid-Open Patent Publication No. 2009-7072

SUMMARY OF THE INVENTION

Problems to be Solved by the Invention

Refilling of contents from a refilling use package such as a pouch according to the conventional art into a preservation container is performed, for example, by abutting the opening part of the opened refilling use package against the opening part of the preservation container and then gradually pouring the contents into the preservation container. Nevertheless, at the time of this work of refilling, the contents can fall out and soil the hands and the surroundings in some cases. Thus, such a system is not satisfactorily user-friendly.

Thus, an object of the present invention is to provide: a container that permits easy refilling of contents into another container and that can maintain the quality of the contents at the time of storage, transportation, and refilling; and a package using the same.

Solution to the Problems

The present invention relates to a container that is fitted in a container body of tubular shape having an open end, a bottom part and a side wall and that transfers contents into a preservation container. This container has: a funnel component provided with a funnel whose diameter decreases from a larger opening side toward a smaller opening side and with a plurality of ribs that extend radially from the center of an opening part on the smaller opening side of the funnel so as to bridge a part with another part of the inner surface of the opening part on the smaller opening side; and a container body.

Advantageous Effects of the Invention

According to the present invention, refilling of contents can be performed in a state that the opening part of a funnel accommodated in a container body is inserted into another container. Thus, a container that permits easy refilling can be constructed.

DESCRIPTION OF EMBODIMENTS

<1. Basic Configuration>

First, a basic configuration of a package according to the present invention is described below with reference to FIGS. 1 to 7.

Figure 1:
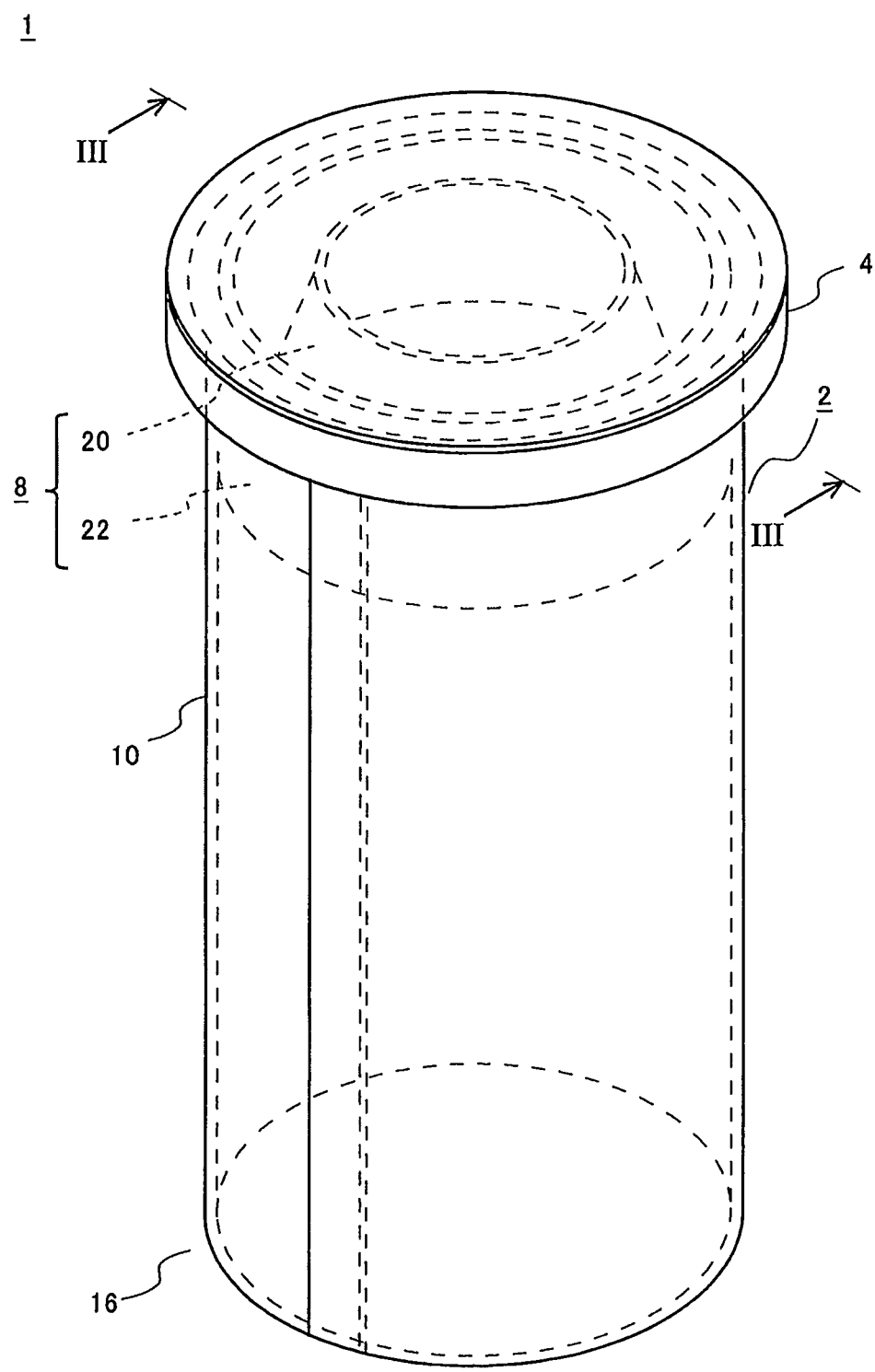
FIG. 1 is a perspective view showing a schematic configuration of a package according to the present invention.
Figure 2:
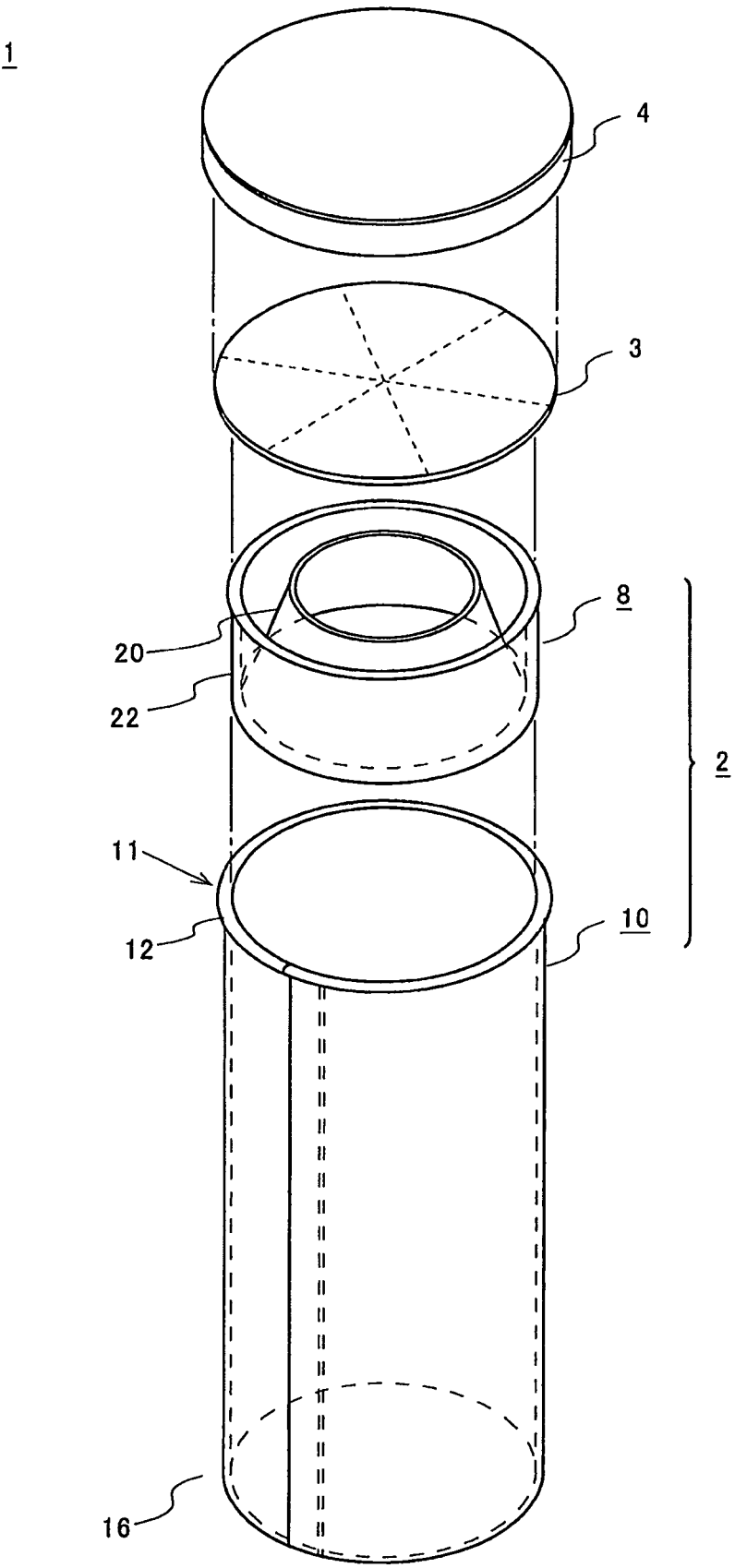
FIG. 2 is an exploded perspective view of a package shown in FIG. 1.
Figure 3:
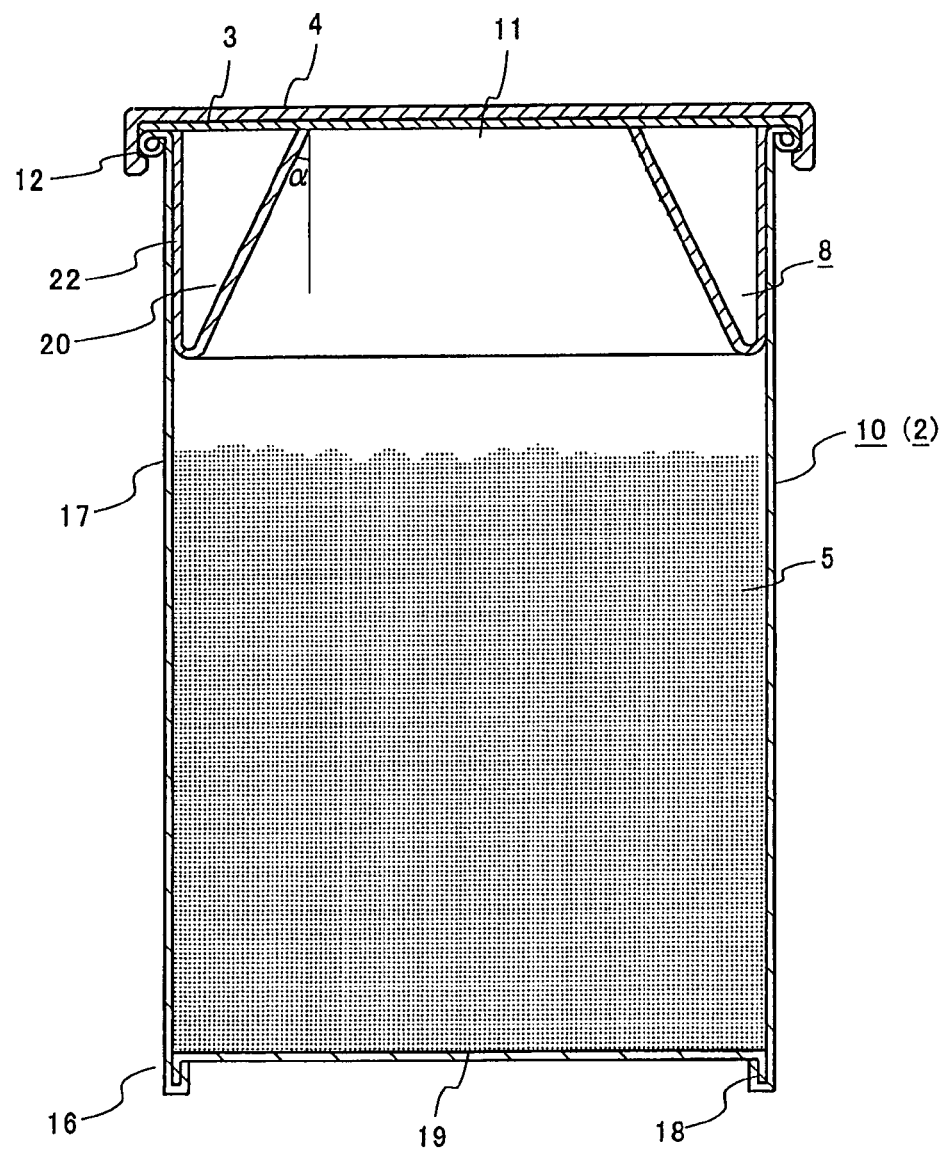
FIG. 3 is a sectional view taken along line in FIG. 1.

FIG. 1 is a perspective view showing a schematic configuration of a package according to the present invention. FIG. 2 is an exploded perspective view of a package shown in FIG. 1. FIG. 3 is a sectional view taken along line in FIG. 1.

A package 1 packs material of powdered, granular, or liquid form and is used as a refilling use package for refilling another preservation container with contents. The package 1 has: a container 2; contents 5 filled in the container 2; and a membrane 3 for closing an open end 11 of the container 2. Further, the container 2 is provided with an over-cap 4 formed from high-density polyethylene (HDPE), polypropylene (PP) or the like for protecting the membrane 3. The contents 5 are not limited to particular ones as long as they have fluidity. Thus, the container 2 according to the present invention is applicable to various kinds of materials such as powder, granules and liquid.

The container 2 has: a cylinder-shaped container body 10 whose one end is opened; and a funnel component 8 including a funnel 20 accommodated in the inside of the container body 10.

The container body 10 has a side wall 17, a bottom part 18, and an open end 11. In the present embodiment, the container body 10 is formed in a tubular form by rounding a sheet material of rectangular shape so as to overlap the material in part and then bonding the overlapped portions with each other. The bottom part 16 of the container body 10 is constructed from: a base plate 19 of circular shape; and a folded part 18 for pinching and holding the outer periphery part of the base plate 19. On the other hand, at the open end 11 of the container body 10, a part of the side wall 17 is bent outward and wound annularly so that a curling 12 is formed.

The forming material for the container body 10 is not limited to a particular one. However, from the perspective of weight reduction of the container, easiness of disposal, and resource saving, a material composed mainly of paper is preferable. As an example, in the application of packing food, a sheet material can be used that is formed by laminating, in the order from the inner surface side of the container body 10, low density polyethylene (LDPE), polyethylene terephthalate (PET), an aluminum foil, and paper and that has a high gas barrier property (a property of cutting off oxygen, water vapor and volatile components of contents origin, like aromatic components, in particular).

The funnel component 8 indicates a component constructed from: a funnel having a part whose diameter decreases toward one end; and members integrated to the funnel. The funnel component 8 illustrated in FIGS. 1 to 3 has: a funnel 20; and a side wall 22 of cylindrical shape connected to the larger opening part of the funnel component 8. The funnel component 8 is inserted into the inside from the open end 11 of the container body 10, and then fitted in an accommodation container 10. As described later, the funnel 20 is provided for permitting easy refilling of contents 5 into another container, and is arranged such that its diameter decreases toward the open end 11. The taper angle α of the funnel 20 is set up appropriately in correspondence to the fluidity of the contents. When the contents are powder, the taper angle is set to be at least 20° to 45° and, more preferably, to be 20°.

The funnel component 8 may be molded integrally, for example, with resin material such as HDPE and PP, or alternatively may be constructed by connecting to each other a funnel 20 and a side wall 22 formed separately from paper, resin, paper mixed resin or the like. When resin or paper mixed resin is used, the funnel component 8 may be formed, for example, by injection molding. The shapes and the attachment arrangement of the funnel 20 and the funnel component 8 are not limited to the example shown in FIGS. 1 to 3. That is, various kinds of variations may be employed.

Figure 4:
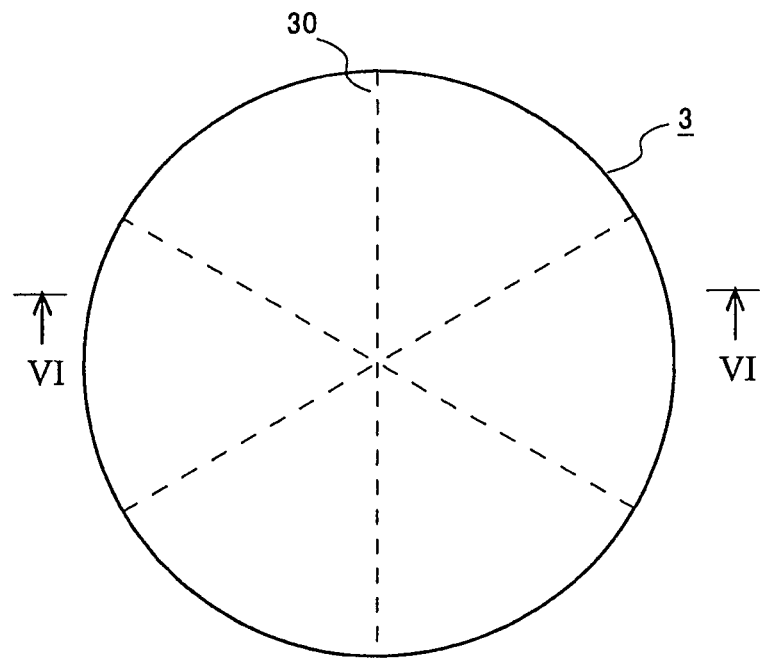
FIG. 4 is a plan view of a membrane shown in FIG. 2.
Figure 5:
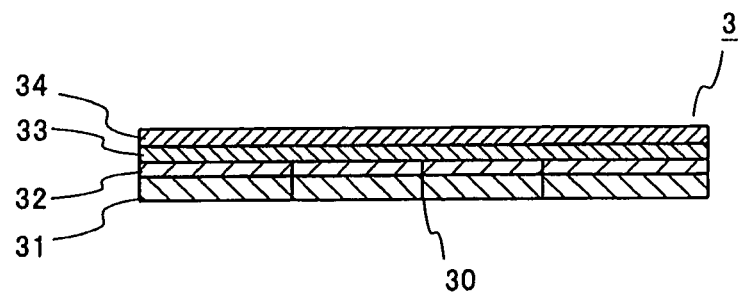
FIG. 5 is a sectional view taken along line V-V in FIG. 4.

FIG. 4 is a plan view of the membrane shown in FIG. 2. FIG. 5 is a sectional view taken along line V-V in FIG. 4.

The membrane 3 is used for sealing the open end 11 of the container 2 after the container 2 is filled with material. In accordance with the application of the container 2, a sheet material composed of a single layer or alternatively a sheet material fabricated by laminating a plurality of layers may be employed. In a case that the contents of the container 2 are food or the like, it is preferable that the membrane 3 is formed from a material having a gas barrier property.

Specifically, as shown in FIG. 5, the membrane 3 is constructed from: a sealant layer 31 for sealing the container 2; a resin layer 32 laminated on the sealant layer 31; and a metallic foil layer 34 bonded on the resin layer 32 via an adhesives layer 33. In an example, the sealant layer 31 may be formed from polyethylene, the resin layer 32 may be formed from polyethylene terephthalate (PET), and the metallic foil layer 34 may be formed from aluminum. The number of laminated layers and the laminating method for the layers constituting the membrane 3 are not limited to particular ones, and may be arbitrary.

In the membrane 3, six cutting lines 30 extending radially from the center are formed such as to permit breakage when a tension exceeding a predetermined magnitude is caused by a pressing force from the outside. In the cutting lines 30, as shown in FIGS. 4 and 5, the sealant layer 31 and the resin layer 32 alone are cut in the thickness direction of the membrane 3. Further, in the extending direction of the membrane 3, the cutting lines 30 are formed in the form of dashed lines.

The cutting lines 30 are provided for adjusting the breaking strength of the membrane 3. Thus, in response to a pressing force applied onto the membrane 3, the number of lines, their shapes, and the length and the depth of the cutting part may be set up arbitrarily. The ideal number of cutting lines 30 is within the range from 3 to 10 counted radially from the center. The cutting lines 30 may be straight lines or alternatively curved lines. Further, in the extending direction of the membrane 3, the cutting lines 30 need not necessarily be perforation of dashed line shape, and may be fabricated in the form of solid lines.

Figure 6:
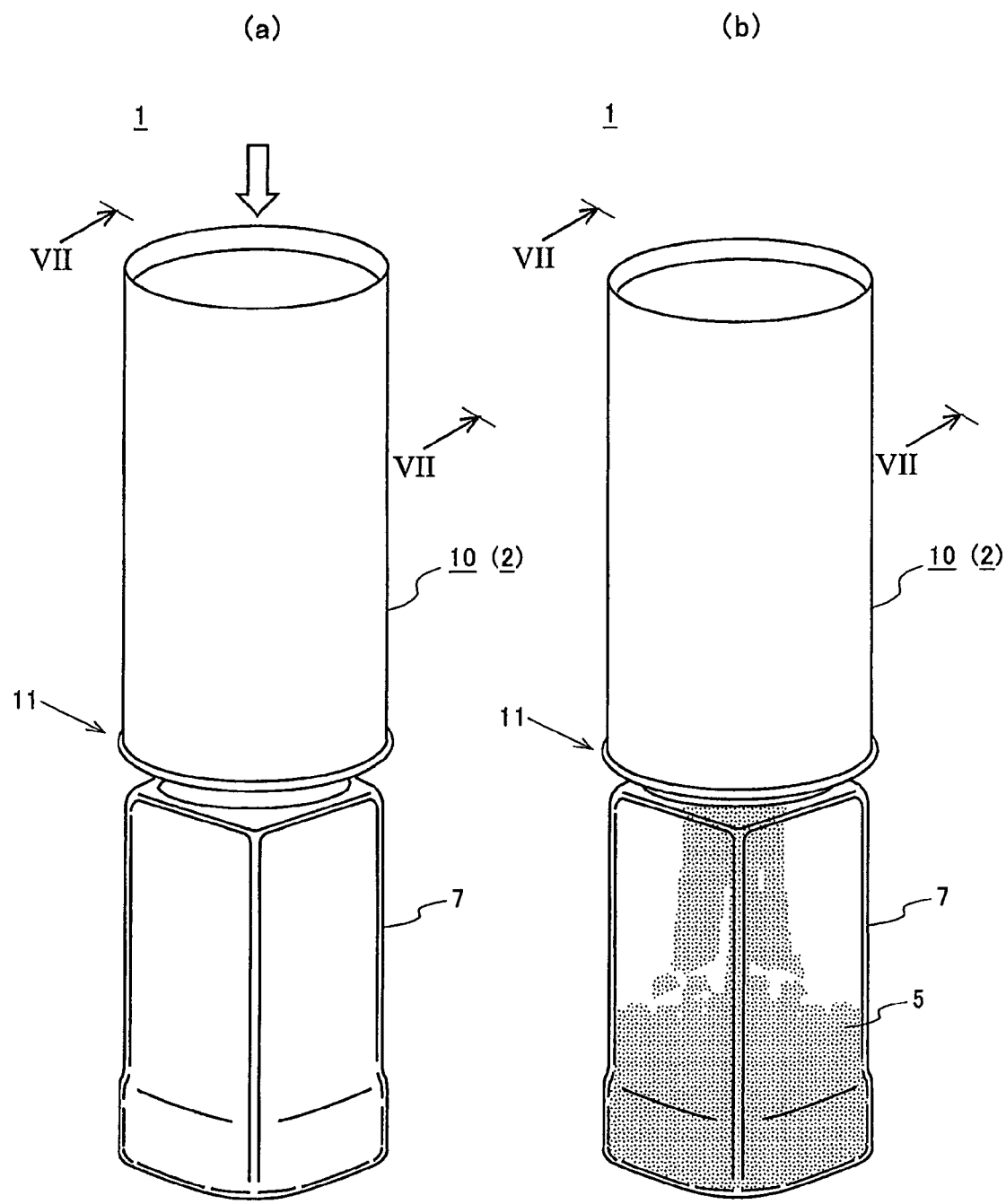
FIG. 6 is a perspective view showing a situation of usage of a package according to the present invention.
Figure 7:
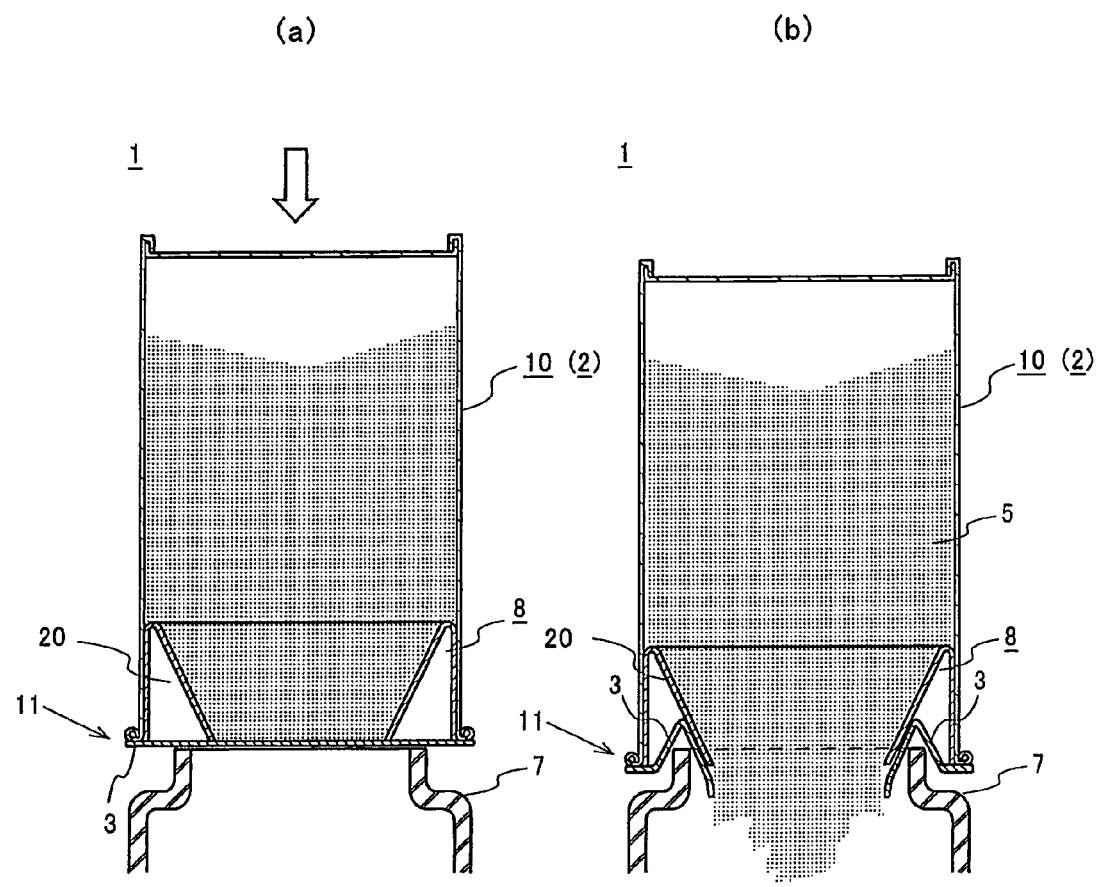
FIG. 7 is a sectional view taken along line VII-VII in FIG. 6.

FIG. 6 is a perspective view showing a situation of usage of a package according to the present invention. FIG. 7 is a sectional view taken along line VII-VII in FIG. 6. More specifically, in FIGS. 6 and 7, part (a) shows the state of the membrane before breakage, while part (b) shows the state of the membrane after breakage.

When another container 7 are to be refilled with the contents 5 in the package 1, first, as shown in FIGS. 6(a) and 7(a), the container 2 whose over-cap has been removed is inverted, and then the membrane 3 is caused to abut against the opening part of the preservation container 7. At that time, in order that the opening part on the smaller opening side of the funnel 20 should be located within the region of the opening part of the preservation container 7, the center of the container 2 is aligned with the center of the preservation container 7.

Then, the bottom part of the package 1 is pressed down in the arrow direction in the figure. At that time, in accordance with the pressing force of the container 2, the membrane 3 receives a pressing force from the funnel 20 and the opening part of the container 7. Then, when the tension in the membrane 3 exceeds a predetermined breaking strength, the membrane 3 is broken as shown in FIGS. 6(b) and 7(b). When the membrane 3 is broken, in accordance with the pressing force applied onto the container 2, the funnel 20 is inserted into the container 7. The broken membrane 3 is folded into a space formed between the funnel 20 and the side wall 22. As a result, a state is realized that the opening part on the outward side of the funnel 20 is opened wide. Thus, in accordance with gravity, the contents 5 flow into the container 7 along the taper of the funnel 20.

As described above, according to the container 2 of the present invention and the package 1 using this, when the membrane 3 is caused to abut against the opening part of the container 7 and then the container 2 is pressed toward the preservation container 7, the opening part of the funnel 20 is inserted into the preservation container 7 almost simultaneously to the breakage of the membrane 3. Thus, the contents 5 in the container 2 are guided to the inside of the preservation container 7 by the funnel 20. This avoids spreading or falling out of the contents 5 at the time of work of refilling. Thus, the container 2 and the package 1 according to the present embodiment permit easy refilling of contents.

Further, until the time of refilling including the duration of storage and transportation, sealing is maintained by the membrane 3 and the container 2. Thus, the quality (flavor, taste and the like) of the contents can be maintained until the time immediately before the usage.

<2. Structure of Cover Material(Membrane)>

The structure of a cover material (membrane) is described below in first to third embodiments.

Here, the present invention is basically applicable to covers of arbitrary kinds that have a barrier property and that are used for sealing a paper cup and opened by breaking of the cover. Thus, obviously, the present invention is not limited to the structures described in the following embodiments.

(First Embodiment)

Figure 10:
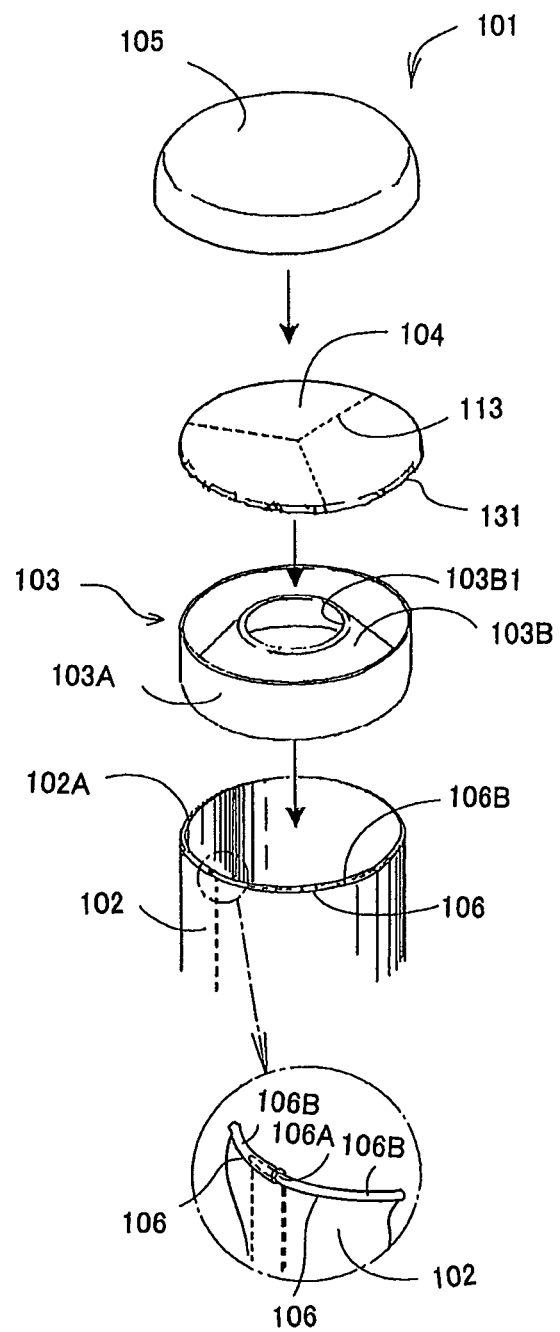
FIG. 10 is an exploded overall perspective view including an enlarged view that provides an enlarged view of a selected part of a container in which a cover having a barrier property of FIG. 8 is applied.
Figure 11:
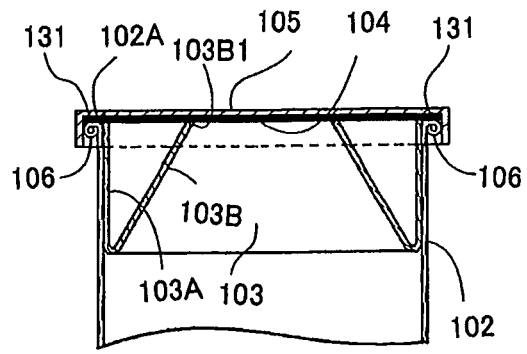
FIG. 11 is a sectional view of one end of a container in a state that a container of FIG. 10 is closed.

First, as shown in FIGS. 10 and 11, a refilling use container 101 has a container body 102, a hopper 103, a cover 104 having a barrier property, and a protection cap 105.

The container body 102 has a cylindrical shape provided with a bottom part. As its substrate material, a rectangular paper piece is adopted. This cylinder fabricated from paper is composed of a composite sheet formed by laminating, in the order from the outermost layer toward the inside, paper, polyethylene, an aluminum foil, polyethylene terephthalate and polyethylene. This is for cutting off humidity and air. The polyethylene resin in the inner surface is for ensuring adhesiveness with the cover 104. The techniques of processing to be adopted here are those known publicly. For example, general techniques in lamination and application are adopted. In the fabrication of the container body 102, a rectangular paper piece whose surface has been treated as described above is rounded into a cylindrical shape. Then, the right and left sides are overlapped. After that, the overlapped parts serving as gluing regions are appropriately bonded to each other. The adopted means of binding may be adhesives, heat seal or other publicly known appropriate means. Then, as shown in FIGS. 10 and 11, at the upper end, an annular wound part (simply a curled part, hereinafter) 106 is formed that is annularly wound outward. Thus, in the upper surface of the curled part 106, in the overlapped part of the two sides, a level difference 106A unavoidably arises in the up and down directions. Since the level difference 106A could degrade the sealing property, its solution is important.

As shown in FIGS. 10 and 11, the hopper 103 of cylindrical shape is fitted into the opening part 102A of the container body 102. The hopper 103 is formed from the same raw material as that of the container body 102 or alternatively from an appropriate resin material such as high-density polyethylene (HDPE) and polypropylene whose thickness is set to be 0.8 mm. The surroundings of the hopper 103 have a straight rising wall 103A not provided with an outward flange at the upper end. In a state that the upper end is located at the same height as the upper end of the opening part 102A of the container body 102, that is, as the upper end face 106B of the curled part 106, the rising wall 103A is fitted in the opening part 102A. Further, from the lower end edge of the rising wall 103A, a funnel 103B gradually inclined toward the upper and center part is provided integrally. Then, the taper angle α of the funnel 103B is set to be at least 20° to 45° and, more preferably, to be 20°.

The hopper 103 is fitted in the opening part 102A in a state that the upper end of the funnel 103B is located at almost the same height as the upper ends of the rising wall 103A and the opening part 102A of the container body 102. That is, alignment is performed such as to allow these to be arranged approximately on the same plane. After being fitted in, the hopper 103 is appropriately fixed to the inner peripheral surface of the opening part 102A. The adopted means of fixing may be an appropriately most preferable one such as heat seal, high frequency welding and adhesives.

Figure 8:
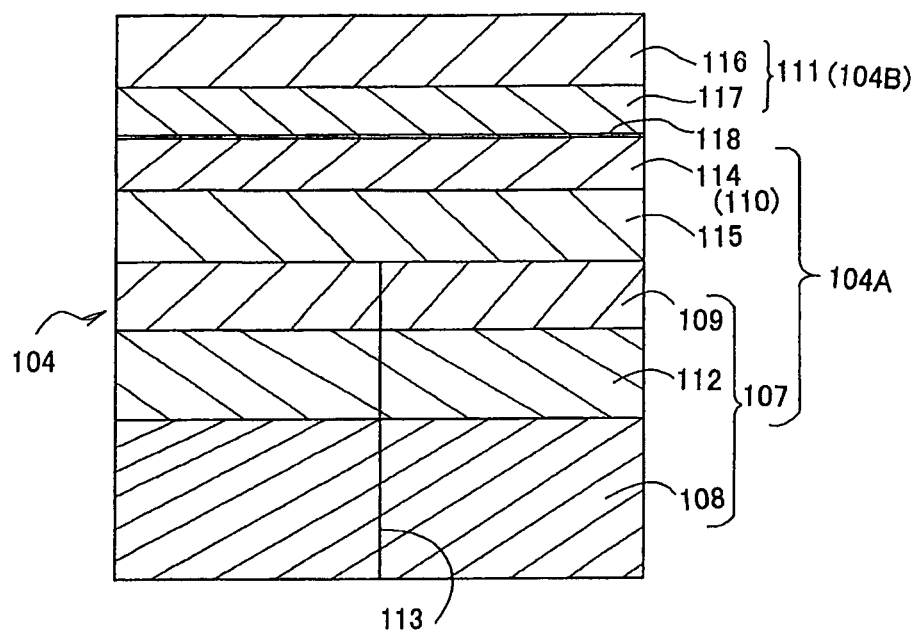
FIG. 8 is a sectional view showing an embodiment of a cover having a barrier property according to the present invention, taken along line A-A in FIG. 9.

The upper end of the hopper 103 is sealed by the cover 104 having a barrier property. As shown in FIG. 8, the cover 104 having a barrier property is composed of a composite sheet fabricated by laminating a lower layer part 104A and an upper layer part 104B with a release agent layer (to be described later) that bonds these two parts in a peelable manner. First, the lower layer part 104A is constructed from: an innermost layer 107 fabricated from a resin layer containing a sealant layer 108 of polyethylene; and a metallic foil layer 110 bonded on the outer side of the resin layer of the innermost layer 107 via an adhesive layer (to be described later). The outer layer 111 serving as the upper layer part 104B is constructed mainly from paper. Then, the upper layer part 104B is bonded onto the outer side of the metallic foil layer 110 of the lower layer part 104A via a release agent layer 118 (to be described later). Furthermore, in the innermost layer 107, a plurality of strength weak parts 113 are provided radially from the center. Then, the strength weak parts 113 allow the metallic foil layer 110 to be broken easily together with the innermost layer 107 so as to permit easy opening.

The above-mentioned configuration is described below in further detail.

The lowermost layer of the innermost layer 107 is a sealant layer 108 of polyethylene (linear low density polyethylene: LLDPE) of 40 μm. Then, on the upper surface of the sealant layer 108 of polyethylene, polyethylene terephthalate (PET) 109 of 12 μm is laminated via an extruded resin film 112 of polyethylene (low density polyethylene: LDPE) of 20 μm. Further, an aluminum foil 114 of 9 μm is adopted as the metallic foil serving as the substrate of the metallic foil layer 110. On the lower surface of the aluminum foil 114, the polyethylene terephthalate (PET) 109 of the innermost layer 107 is bonded and laminated via the extruded resin film 115 of polyethylene (low density polyethylene: LDPE) of 15 μm. Thus, the extruded resin film 115 serves as an adhesive layer between the innermost layer 107 and the metallic foil layer 110. Further, the outer layer 111 serving as the upper layer part 104B bonded and laminated onto the outer side of the aluminum foil 114 is composed of a paper layer 116 having a basis weight of 52.3 g/m2. Then, a polyethylene (low density polyethylene: LDPE) extruded resin film 117 of 15 μm is laminated on the lower surface of the paper layer 116. The extruded resin film 117 and the aluminum foil 114 are bonded to each other via a release agent layer 118 composed of peeling varnish or the like, so that a composite sheet is formed. As the means of processing of this composite sheet, publicly known techniques are adopted in addition to the above-mentioned ones. General techniques in lamination and application are adopted. Further, as the release agent layer 118, peeling varnish (chlorinated rubber is applied uniformly) or adhesives varnish (chlorinated rubber is applied in the form of dots) is adopted. The adopted peeling varnish may be a combination of one or more kinds and two or more layers. Further, the mode of application may be uniform or alternatively in the form of dots.

The thickness of the sealant layer 108 of polyethylene is selected appropriately in the range, preferably, from 30 to 200 μm. The thickness of the extruded resin film 112 of polyethylene on the sealant layer 108 is selected appropriately in the range, preferably, from 5 to 50 μm. Further, the aluminum foil 114 of the metallic foil layer 110 is selected appropriately from those having a thickness within the range from 6 to 50 μm. As for the extruded resin film 115 of polyethylene of the lower surface of the aluminum foil 114, appropriate one is selected from those having a value within the range from 5 to 50 μm. As for the paper layer 116, appropriate one is selected from those having a value within the range, preferably, from 30 to 200 g/m2 by basis weight. Further, as for the extruded resin film 117 of polyethylene (low density polyethylene: LDPE) laminated on the lower surface of the paper layer 116, appropriate one is selected from those having a value within the range from 5 to 50 μm. As for the release agent layer 118, peeling varnish or adhesives varnish is adopted. Peeling varnish is applied uniformly, while adhesives varnish is applied in the form of dots.

Here, as for the polyethylene terephthalate (PET) 109 laminated on the sealant layer 108 of polyethylene, appropriate one is selected from those having a value within the range from 5 to 50 μm. However, the polyethylene terephthalate (PET) 109 may be provided only when necessary.

The overall shape of the cover 104 is a circle having almost the same diameter as the opening part 102A of the container body 102, specifically, approximately 90 mmφ as shown in FIGS. 10 and 11. Then, its edge part 131 is appropriately bonded onto the upper end of the opening part 102A of the container body 102, that is, on the upper end face 106B of the curled part 106. In general, this bonding is achieved by heat seal. Here, the bonding may be performed onto the upper end face of the rising wall 103A of the hopper 103. However, in this configuration, the cover 104 merely contacts with the upper edge of the funnel 103B of the hopper 103, that is, with the upper edge of the opening part 103B1.

Figure 9:
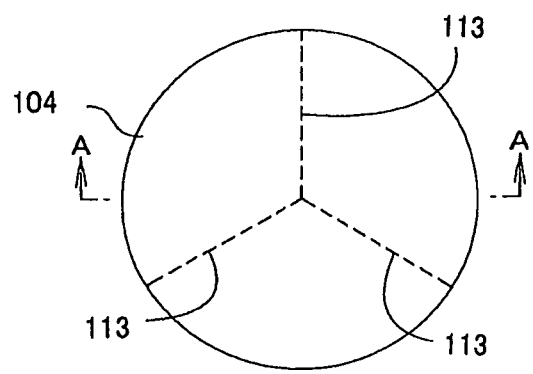
FIG. 9 is a bottom view of a cover of FIG. 8.

Further, in the cover 104 having a barrier property, as shown in FIGS. 8 to 10, perforation or cutting lines (perforation in the example in the figure) serving as three strength weak parts 113 are provided in radial directions from the center at approximately regular intervals in the circumferential direction. The range of providing is to the innermost layer 107 and the extruded resin film 115 of polyethylene. The perforation or cutting lines serving as the strength weak parts 113 allow the metallic foil layer 110 to be broken easily together with the innermost layer 107 so as to permit easy opening. In the perforation or cutting lines, as shown in FIG. 9, the length of each perforation is set to be 9 mm while the connection is set to be 1 mm. Here, the value three for the number of lines is the minimum requirement for achieving the desired object of the present invention. Further, the upper limit for a preferable value of the number of lines is ten, although this depends on the size of the cover 104. In contrast, the number of lines equal to or greater than 11 causes the concern of weakening the strength of the cover 104, and hence is not preferable. Ideally, the number of lines is 3 to 10 (6 in the examples shown in FIG. 16).

In the protection cap 105, the same material as that of the container body 102 or alternatively an appropriate resin such as high-density polyethylene (HDPE) and polypropylene whose thickness is set to be approximately 0.8 mm is adopted. As shown in FIGS. 10 and 11, the protection cap 105 is fitted over the opening part 102A of the container body 102 so as to protect the cover 104 and keep the inside hygienic.

The work of charging powdered instant coffee P into the refilling use container 101 according to the present invention is performed, in general, via the opening part 103B1 of the hopper 103.

Next, a method of use of the refilling use container 101 having the above-mentioned configuration according to the first embodiment is described below.

Figure 12:
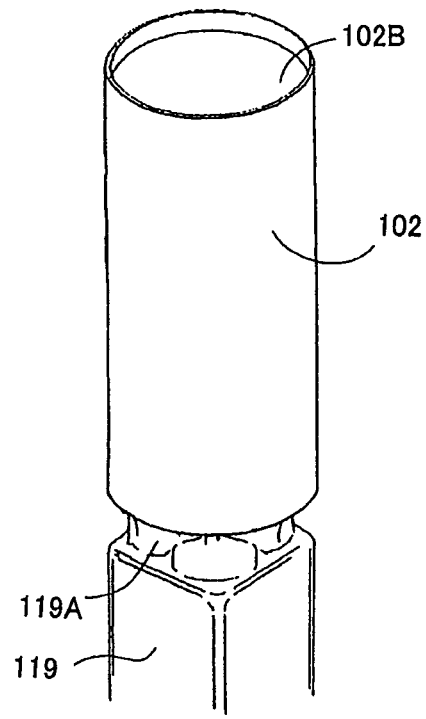
FIG. 12 is an explanation diagram of operation of a cover having a barrier property of FIG. 8, in the form of a perspective view showing relation between a cover, a container and a jar before the jar is refilled with contents.
Figure 13:
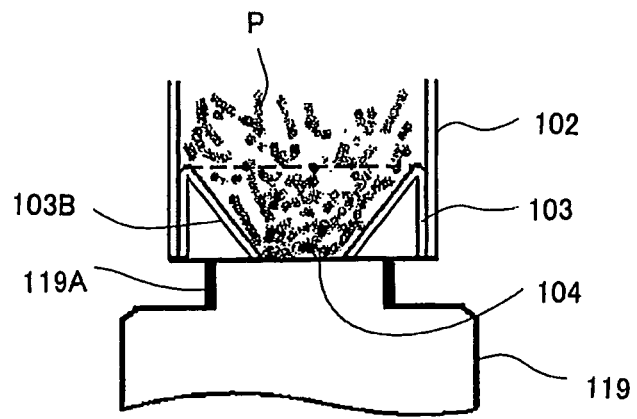
FIG. 13 is an explanation diagram of operation of a cover shown in FIG. 12, in the form of a sectional view of a main part.
Figure 14:
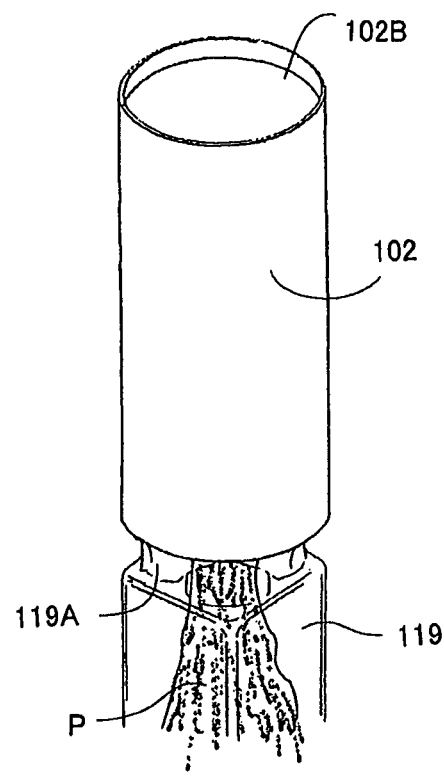
FIG. 14 is an explanation diagram of operation of a cover having a barrier property of FIG. 8, in the form of a perspective view showing relation between a cover, a container and a jar in the course that the jar is refilled with contents.
Figure 15:
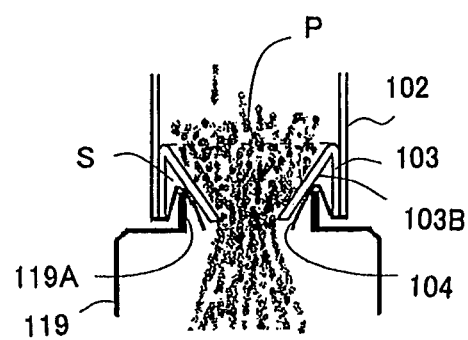
FIG. 15 is an explanation diagram of operation of a cover shown in FIG. 14, in the form of a sectional view of a main part.

First, the protection cap 105 is removed. Then, the cover 104 is exposed. Thus, the edge of the outer layer 111 serving as the upper layer part 104B is pinched and pulled upward with fingers. As a result of pull-up, the outside layer 111 is removed from the aluminum foil 114 of the lower metallic foil layer 110 at the level of the release agent layer 118 serving as a peeling layer. At that time, peeling sound is generated. This provides strong impression of a virgin property. Then, as shown in FIGS. 12 and 13, the container body 102 is inverted. Then, the funnel 103B of the hopper 103 is caused to abut against a cylindrical opening part 119A of the jar 119 serving an example of a refill container in a position that permits fit-in. The instant coffee P in the container body 102 has already flown down into the funnel 103B from the hopper 103, but is held by the cover 104. Then, as shown in FIGS. 14 and 15, a pressing force is applied onto the container body 102 such that the funnel 103B is pushed into the opening part 119A of the jar 119. This pressing force acts as a force for causing the opening part 119A of the jar 119, in general, the cylindrical part rising cylindrically from the body, to press and break the cover 104. That is, the force acts as a force for causing the opening part 119A of the jar 119 to push up the cover 104 and pushing this into a triangular space S in a cross sectional view formed between the rising wall 103A and the funnel 103B of the hopper 103. Since perforation serving as the strength weak parts 113 is provided radially, the cover 104 receiving this pressing force is broken and divided into a plurality of split pieces along the perforation rapidly and remarkably easily. At the same time, the funnel 103B goes into the opening part 119A of the jar 119. As a result, the opening part 103B1 of the funnel 103B of the hopper 103 is opened. Thus, with being guided toward the center by the funnel 103B of the hopper 103, the instant coffee P in the container body 102 flows down into the jar 119 at once. After the refilling of the jar 119 is completed, the refilling use container 101 is discarded. Numeral 102B in the figure indicates the bottom part of the container body 102.

Thus, the funnel 103B fitted into the opening part 119A of the jar 119 guides and causes the instant coffee P to flowing down into the jar 119 without falling outside the jar 119. Further, a possibility is avoided that the contents are exposed to open air unnecessarily. Thus, a possibility that the flavor and the taste is degraded can also be avoided as far as possible.

As a result of a performance test for the obtained cover, the center part was pressed and broken satisfactorily. Here, its press-breaking strength was 100 N or lower. Further, in a check test for liquid immersion at the level difference 106A of the opening part 102A employing a paper cup, leakage occurrence was not detected at all. Further, even when samples were stored at high temperatures, no example was found that the cover is spontaneously peeled off from the opening part 102A of the paper cup. Further, a satisfactory barrier property in the entire cover comparable to an aluminum cover was obtained. Odor generating was not detected in comparison with a hot melt cover. Further, a transportation test equivalent to 2000-km transportation was conducted so that the breakage situation of the perforation was investigated. As a result, by virtue of the presence of the outer layer 111 composed mainly of paper, breakage in the perforation was not generated in any sample.

As such, the innermost layer of the cover 104 is provided with the sealant layer 108 of polyethylene (linear low density polyethylene: LLDPE). Thus, regardless of the presence of the level difference 106A in the opening part 102A which is specific to a paper cup, even when the opening part 102A of the paper cup is directly sealed by the cover 104, satisfactory sealing is achieved. As a result, satisfactory air tightness can be realized. Further, since hot melt is not adopted, a stable sealing property is obtained while the influence of odor can be eliminated. Further, despite that the cover 104 has the strength weak parts 113 in the inside, the metallic foil layer 110 and the innermost layer 107 in the inside can securely be protected from an external shock or a pressing force. Thus, the cover 104 having high safety has been provided. Further, before the work of pressing and breaking the cover 104 along the strength weak parts 113, when the outer layer 111 composed mainly of paper is peeled off, light peeling sound is generated. This provides strong impression of a virgin property.

(Second Embodiment)

Figure 17:
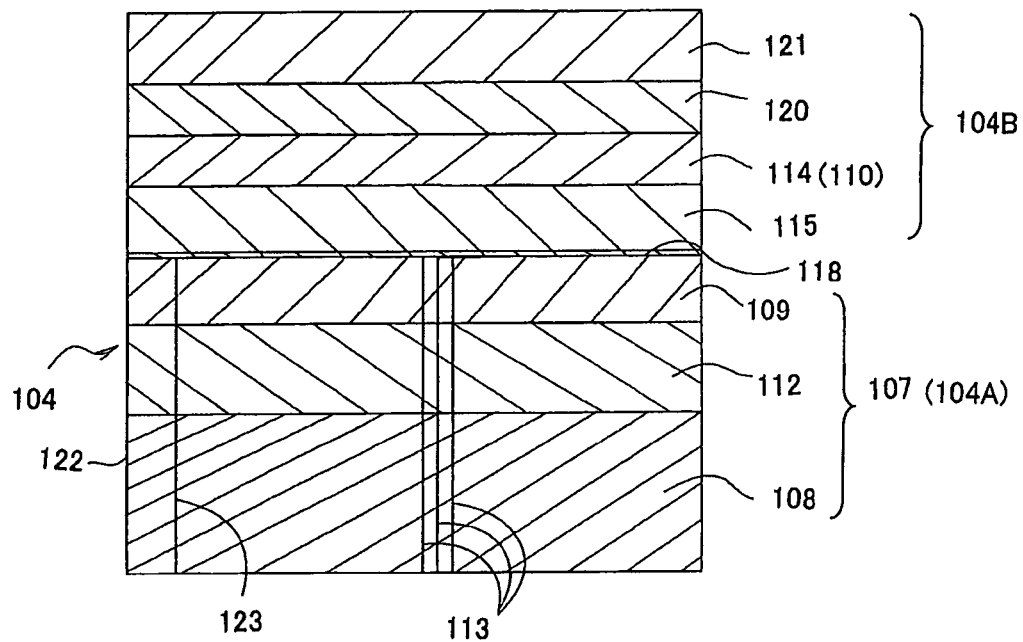
FIG. 17 is a sectional view showing a configuration of a cover according to a second embodiment, taken along line A-A in FIG. 18.

As shown in FIG. 17, a cover 104 having a barrier property described in a second embodiment is composed of a composite sheet in which a lower layer part 104A composed mainly of a sealant layer 108 of polyethylene and an upper layer part 104B composed mainly of a metallic foil layer 110 are laminated with each other via a release agent layer 118. The lowermost layer of the innermost layer 107 is a sealant layer 108 of polyethylene (linear low density polyethylene: LLDPE) of 40 µm. On the upper surface of the sealant layer 108 of polyethylene, polyethylene terephthalate (PET) 109 of 12 µm is laminated via an extruded resin film 112 of polyethylene (low density polyethylene: LDPE) of 20 µm. Further, an aluminum foil 114 of 7 µm is adopted as the metallic foil serving as the substrate of the metallic foil layer 110. A polyethylene (low density polyethylene: LDPE) extruded resin film 115 of 20 µm is laminated on the lower surface of the aluminum foil 114. On the other hand, on the upper surface, polyethylene terephthalate (PET) 121 of 12 µm is laminated via an extruded resin film 120 of polyethylene (low density polyethylene: LDPE) of 15 µm. Then, the polyethylene terephthalate (PET) 109 of the lowermost layer 107 and the extruded resin film 115 of polyethylene (low density polyethylene: LDPE) of the lowermost surface of the upper layer part 104B are bonded to each other via the release agent layer 118. As the release agent layer 118, peeling varnish (chlorinated rubber is applied uniformly) or adhesives varnish (chlorinated rubber is applied in the form of dots) is adopted. The adopted peeling varnish may be a combination of one or more kinds and two or more layers. Further, the mode of application may be uniform or alternatively in the form of dots. In the configuration adopted in the present embodiment, on the upper surface of the polyethylene terephthalate (PET) 109 of the innermost layer 107, peeling varnish of chlorinated rubber is first applied uniformly and then adhesives varnish of chlorinated rubber is applied thereon in the form of dots.

In the above-mentioned configuration, in the lower layer part 104A, an aluminum foil, a plastic film, or a laminated material of paper or the like may be adopted. Further, in place of these, the sealant layer 108 of polyethylene (linear low density polyethylene: LLDPE) may be adopted alone. Further, also in the upper layer part 104B, a single aluminum foil, or a laminated material composed of a plastic film and paper is adopted depending on the necessity. The aluminum foil is selected from those within the range from 6 to 50 µm. The extruded resin film 115 of polyethylene (low density polyethylene: LDPE) of the aluminum foil 114 lower surface is selected from those within the range from 5 to 50 µm.

Further, the release agent layer 118 may be composed of an easy peeling film. The thickness is set to be 20 to 100 µm, while the adhesive strength with the extruded resin film 115 of polyethylene (low density polyethylene: LDPE) in the lowermost surface of the upper layer part 104B is set to be 0.1 to 8 N.

Further, in the cover 104 from the lower layer part 104A to the upper layer part 104B, a tab 122 is provided that protrudes outward in a radial direction from the edge of the cover 104. The tab 122 causes the upper layer part 104B to be peeled off from the lower layer part 104A at the release agent layer 118, via the cutting lines (perforation) 123 provided between the tab and the edge of the lower layer part 104A. Such a tab 122 may be provided in the first embodiment described above.

Figure 18:
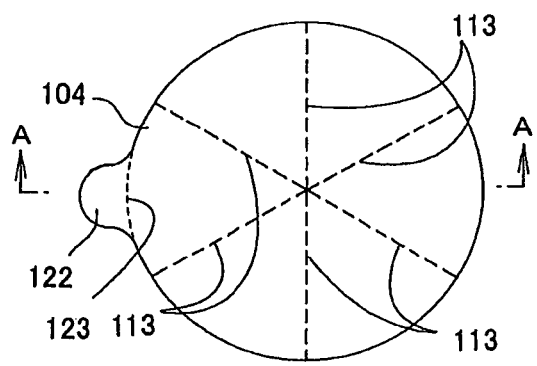
FIG. 18 is a bottom view of a cover of FIG. 17.

Further, as shown in FIG. 18, the shape of the cover 104 is basically similar to that of the first embodiment except for the configuration of the tab 122. The difference is that six lines of perforation serving as the strength weak parts 113 are provided radially at equal intervals from the center toward the edge. Further, a paper cup is adopted in which the container body 102 has a layered aluminum structure.

The results of performance test for the cover are as follows. That is, results similar to those of the first embodiment were obtained in an opening property, a sealing property, a barrier property, the presence or absence of odor, protection for the strength weak parts, a virgin property. Further, by using the tab 122, the upper layer part can be peeled off properly, and hence satisfactory feeling of peeling was obtained.

(Third Embodiment)

Figure 19:
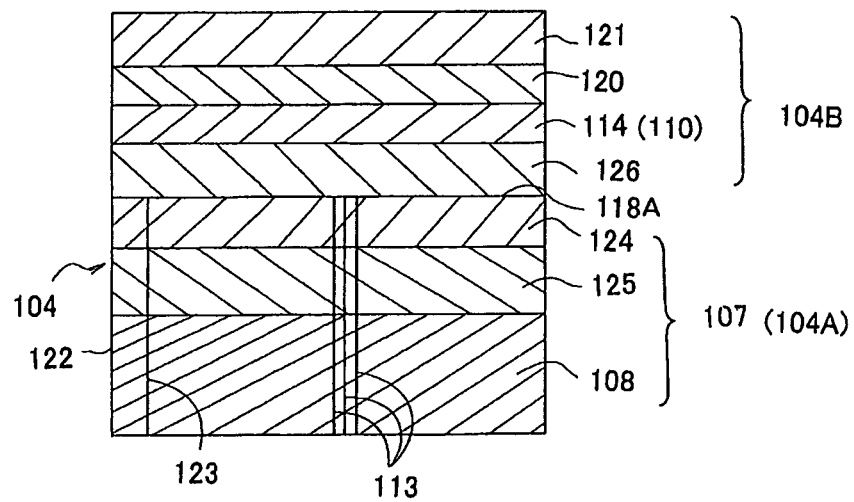
FIG. 19 is a sectional view showing a configuration of a third embodiment, in correspondence to FIG. 17.

As shown in FIG. 19, a cover 104 having a barrier property described in a third embodiment is also composed of a composite sheet in which a lower layer part 104A composed mainly of a sealant layer 108 of polyethylene and an upper layer part 104B composed mainly of a metallic foil layer 110 are laminated with each other via a releasing surface 118A. The lowermost layer of the innermost layer 107 is a sealant layer 108 of polyethylene (linear low density polyethylene: LLDPE) of 40 μm. A oriented polypropylene film (OPP) 124 of 20 μm was laminated on the upper surface of the sealant layer 108 of polyethylene by using dry laminate adhesives 125, so that a laminated film as the lower layer part 104A was obtained. Then, six lines of perforation, as strength weak parts 113, was fabricated in the directions extending radially from the center of this laminated film to the sealing position with the container body 102. The length of the perforation was 9 mm, while the connection length was 1 mm. In the upper layer part 104B, the aluminum foil 114 of 7 μm was adopted as the metallic foil layer 110. Further, on the upper surface of the aluminum foil 114, polyethylene terephthalate (PET) 121 of 12 μm was laminated via an extruded resin film 120 of polyethylene (PE) of 20 μm. Then, the upper surface of the oriented polypropylene film (OPP) 124 of the lowermost layer 107 and the lower surface of the aluminum foil 114 were extruded and laminated with a resin film 126 of polyethylene (PE). As a result, a two-layered laminated film that can be peeled off can be obtained. This laminated film was punched into a shape of a circle with tab having a specified size, so that the cover 104 was obtained. The resin film 126 of the extruded polyethylene (PE) and the oriented polypropylene film (OPP) 124 were fabricated from different kinds of resins from each other. Thus, complete adhesion did not occur, and hence the upper layer part 104B was able to be peeled off from the lower layer part 104A at the releasing surface 118A by hand. In this third embodiment, as described above, the resin film of the uppermost layer of the lower layer part 104A and the resin film of the lowermost layer of the upper layer part 104B were fabricated from different kinds of resins from each other so that easily peelable surface was obtained. As a result, the configuration of the release agent layer was simplified. This simplifies the process works and steps in fabrication, and hence reduces the cost.

The results of performance test for the cover are as follows. That is, results similar to those of the first embodiment were obtained in an opening property, a sealing property, a barrier property, the presence or absence of odor, protection for the strength weak parts, a virgin property. Further, by using the tab 122, the upper layer part can be peeled off properly, and hence satisfactory feeling of peeling was obtained.

For the purpose of testing the above-mentioned results, comparison products were fabricated.

Figure 20:
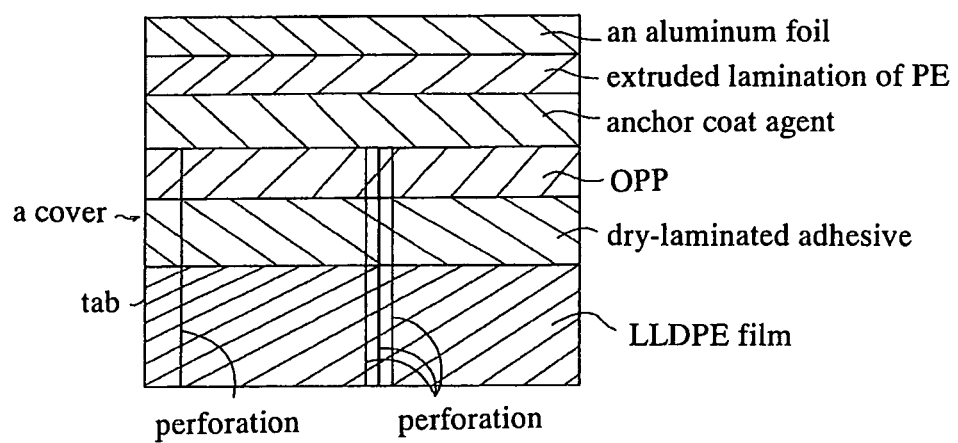
FIG. 20 is a sectional view showing a comparison example, in correspondence to FIG. 19.

As shown in FIG. 20, the oriented polypropylene film (OPP) of a thickness 20 μm and the polyethylene (linear low density polyethylene: LLDPE) film of a thickness 40 μm were dry-laminated with each other so that a laminated film was obtained. Then, six lines of perforation having a perforation length of 9 mm and a connection length of 1 mm were fabricated in the laminated film by a pinnacle cutter in the directions extending radially from the center of the circular cover material to the sealing position, so that a lower layer film was obtained. On the other hand, an aluminum foil of 7 μm was bonded by extruded lamination of polyethylene (PE) 15 μm, so that an upper film was obtained. Then, the upper and the lower layer films were laminated on the above-mentioned oriented polypropylene film (OPP) surface via an anchor coat agent, so that a laminated film was obtained. Then, this laminated film was punched into a circle having a specified size, so that a cover material was obtained.

Each obtained cover material was bonded and sealed onto the edge of the opening part 102A of the container body 102 that is described in the first embodiment and contains instant coffee powder. Then, performance tests were performed with respect to the opening property and the drop impact resistance of the cover.

In the inspection for the opening property, as for a product according to the present embodiment, after the upper layer part 104B was removed by pinching the tab 122, refilling into a glass bottle was performed. Further, in the comparison example, refilling was performed in an intact state. Then, the pressing strength was measured at the time that the product is caused to abut against the bottle opening and breaks the cover material.

As a result of inspection, the unsealing strength was 90 g in the present embodiment, and 130 g in the comparison example. This showed that a much better opening property was obtained in the present embodiment.

Further, in the inspection for the drop impact resistance, in each of the present embodiment and the comparison example, the container was dropped from a position of 60-cm height in a state that the opening part 102A of the container body 102 was sealed by the cover material. Then, the presence or absence of breakage starting from the perforation was checked by visual inspection.

As a result of inspection, no breakage was detected both in the present embodiment and in the comparison example even after 10 times of dropping. Thus, as for the drop impact resistance, superiority of the present embodiment was not obtained.

Here, in the first to the third embodiments, at the upper end of the rising wall 103A of the hopper 103, a flange may be provided that is airtightly fitted in the opening edge of the container body 102. Among the functions of the cover 104 itself described in the first to the third embodiments described above, the advantages such as the opening property, the high temperature holding property, the barrier property, the odor, and the feeling of opening, as well as the processability and stability of the strength weak parts 113, are completely obtained equivalently without degradation.

Further, in the first to the third embodiments, instant powder coffee is adopted as the contents. However, other powdery fluid of food or non-food may be adopted. For example, water-soluble milk (powdered milk), cocoa, tea, or powder of a combination of these may be adopted. Further, dried mashed potato and other dried food, source or gravy powder, and soup powder, as well as toner for a copying machine may be adopted.

Further, in place of the jar 119, the embodiments may be applied to a coffee powder tank of a coffee maker, a toner refilling container of a copying machine, and the like.

The first to the third embodiments justify the following items 1 to 10 as the scope of protection of the present invention.

1. A cover having a barrier property, comprising: a lower layer part including an innermost layer and a metallic foil layer, the innermost layer having a sealant layer of polyethylene in a lowermost layer; and an upper layer part that is capable of being peeled off from the lower layer part, wherein a plurality of strength weak parts are provided in the innermost layer of the lower layer part, wherein the upper layer part is capable of being separated from the lower layer part by peeling off the upper layer part from the lower layer part, and wherein at the time of use, the lower layer part is broken along the strength weak parts so that easy opening is achieved.

2. A cover having a barrier property, comprising: a lower layer part composed of a laminated material obtained by laminating, on an innermost layer, at least any one of a metallic foil layer, a synthetic resin layer and a paper layer, the innermost layer having at least a sealant layer of polyethylene in a lowermost layer; and an upper layer part that is composed of a laminated material provided with a metallic foil layer and obtained by laminating thereon at least any one of a synthetic resin layer and a paper layer, the upper layer part being laminated on an outer side of the lower layer part via a peeling layer, wherein a plurality of strength weak parts are provided in the lower layer part, wherein the upper layer part is capable of being separated from the lower layer part via the peeling layer, and wherein at the time of use, the lower layer part is broken along the strength weak parts so that easy opening is achieved.

3. A cover having a barrier property, comprising: a lower layer part obtained by bonding a metallic foil layer on an innermost layer via an adhesives layer, the innermost layer having at least a sealant layer of polyethylene in a lowermost layer; and an upper layer part composed mainly of paper laminated via a peeling layer on an outer side of the metallic foil layer of the lower layer part, wherein a plurality of strength weak parts are provided radially from the center in an innermost layer of the lowermost layer, wherein the upper layer part is capable of being separated from the peeling layer, and wherein at the time of use, the metallic foil layer is broken together with the innermost layer of the lower layer part along the strength weak parts so that easy opening is achieved.

4. The cover having a barrier property described in any one of items 1 to 3, wherein the strength weak parts are perforation or cutting lines.

5. The cover having a barrier property described in any one of items 1 to 4, wherein the number of the strength weak parts is equal to or greater than three and the strength weak parts are provided radially from a center to an edge at substantially the same central angles.

6. The cover having a barrier property described in any one of items 1, 2, 4 and 5, wherein the lowermost layer of the innermost layer in the lower layer part is a polyethylene resin layer, and wherein the cover has a two-layered structure obtained by bonding a resin layer on the polyethylene resin layer via an adhesive layer.

7. The cover having a barrier property described in any one of items 1 to 6, wherein the upper layer part is constructed from a paper or metallic foil layer and an extruded polyethylene resin layer bonded at least on a rear surface of the paper or metallic foil layer.

8. The cover having a barrier property described in any one of items 1 to 7, wherein the peeling layer is any one of peeling varnish, adhesives varnish, and an easy peeling film.

9. The cover having a barrier property described in any one of items 1 to 8, wherein the resin film of the uppermost layer in the lower layer part is made of resin which is different from resin for forming the resin film of the lowermost layer in the upper layer part so that the upper layer part is capable of being peeled off from the lower layer part.

The structure of a cover (membrane) is described below in the following fourth and fifth embodiments. Specifically, the structure of a cover that has a feature concerning the shape of the strength weak parts (cutting lines) is described below.

(Fourth Embodiment)

Figure 24:
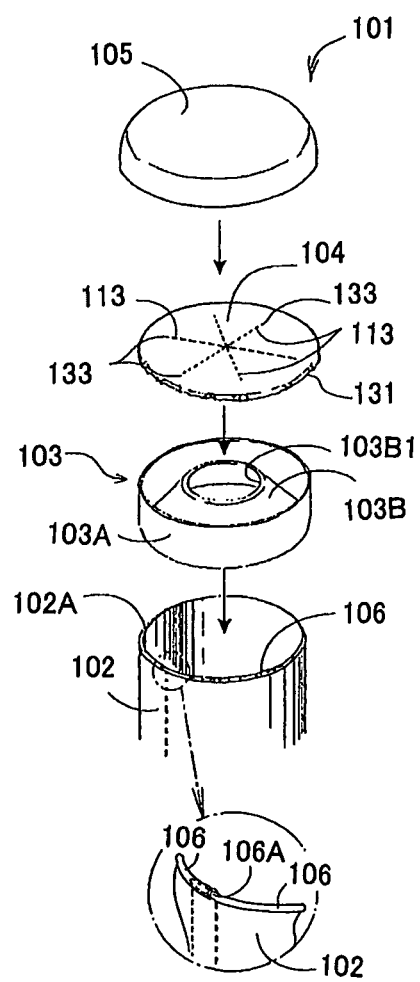
FIG. 24 is an exploded overall perspective view including an enlarged view that provides an enlarged view of a selected part of a container in which a cover having a barrier property of FIG. 21 is applied.
Figure 25:
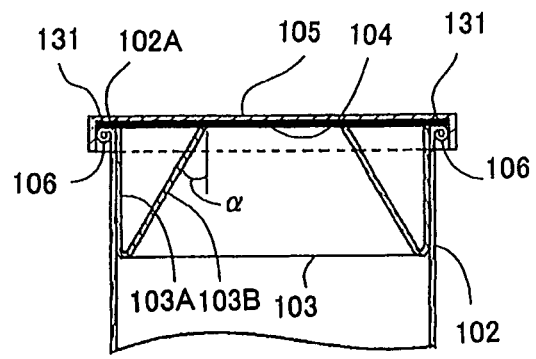
FIG. 25 is a sectional view of one end of a container in a state that a container of FIG. 23 is closed.

First, similarly to the first to the third embodiments, as shown in FIGS. 24 and 25, a refilling use container 101 is constructed from: a tubular container body 102; a hopper 103; a cover 104 having a barrier property; and a protection cap 105. Thus, detailed description is omitted here.

The upper end of the hopper 103 is sealed by the cover 104 having a barrier property.

Figure 22:
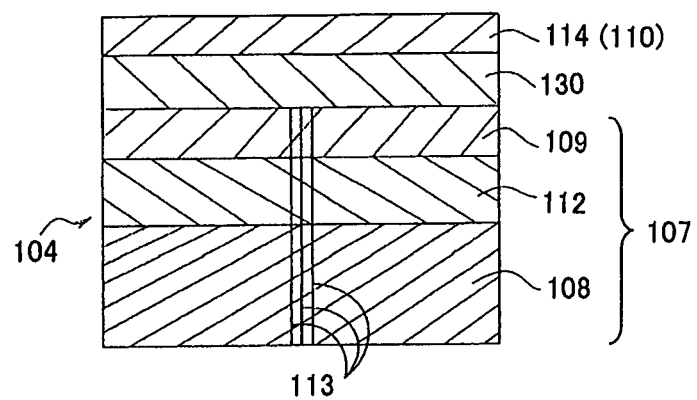
FIG. 22 is a sectional view taken along line A-A in FIG. 21.

As shown in FIG. 22, in the cover 104 having a barrier property, a composite sheet is adopted that is constructed from an innermost layer 107 and a metallic foil layer 110 bonded on the outer side of the innermost layer 107. More specifically, the innermost layer 107 is a resin layer containing a sealant layer 108 of polyethylene. The metallic foil layer 110 is bonded via an adhesive layer (to be described later) on the outer side of the resin layer of the innermost layer 107, so that the composite sheet is formed. Further, in the innermost layer 107, a plurality (three to ten) of strength weak parts 113 are provided radially from the center. Then, the strength weak parts 113 allow the metallic foil layer 110 to be broken easily together with the innermost layer 107 so as to permit easy opening.

The above-mentioned configuration is described below in further detail.

The lowermost layer of the innermost layer 107 is a sealant layer 108 of polyethylene (linear low density polyethylene: LLDPE) of 100 μm. Then, on the upper surface of the sealant layer 108 of polyethylene, polyethylene terephthalate (PET) 109 of 12 μm is laminated via an extruded resin film 112 of polyethylene (low density polyethylene: LDPE) of 15 μm. Further, as the metallic foil layer 110, an aluminum foil 114 of 7 μm is adopted. The composite sheet is formed by bonding the polyethylene terephthalate 109 of the innermost layer 107 onto the lower surface of the aluminum foil 114 via an extruded resin film 130 of polyethylene (low density polyethylene: LDPE) of 15 μm. The extruded resin film 130 of polyethylene (low density polyethylene: LDPE) serves as an adhesive layer. As the means of processing of this composite sheet, publicly known techniques are adopted in addition to the above-mentioned ones. General techniques in lamination and application are adopted.

Here, the scope of adhesive layers covers adhesives in a broad sense including dry laminate and the extrusion polyethylene or the like described above. In the present invention, these are generically referred to as adhesive layers in a broad sense. Further, the polyethylene terephthalate (PET) 109 laminated on the sealant layer 108 of polyethylene may be provided only when necessary.

The thickness of the sealant layer 108 of polyethylene is selected appropriately in the range, preferably, from 30 to 200 μm. The thickness of the extruded resin film 112 on the sealant layer 108 of polyethylene is selected appropriately in the range, preferably, from 5 to 50 μm. Further, the thickness of the aluminum foil 114 of the metallic foil layer 110 is selected appropriately in the range from 6 to 50 µm. Further, the thickness of the extruded resin film 130 of polyethylene (low density polyethylene: LDPE) laminated on the lower surface is selected appropriately in the range from 5 to 50 µm.

Figure 21:
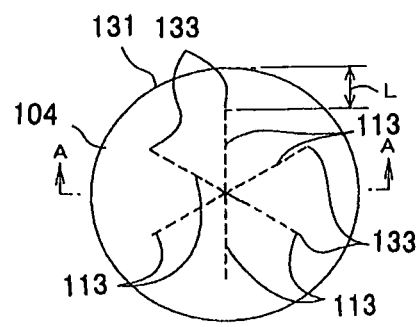
FIG. 21 is a bottom view of a cover having a barrier property according to a fourth embodiment of the present invention.

The overall shape of the cover 104 is a circle having almost the same diameter as the opening part 102A of the container body 102, specifically, approximately 90 mmφ as shown in FIGS. 21, 24 and 25. Then, its edge part 131 is appropriately bonded onto the upper end of the opening part 102A of the container body 102, that is, on the upper end face of the curled part 106. In general, this bonding is achieved by heat seal. Here, the bonding may be performed onto the upper end face of the rising wall 103A of the hopper. However, in this configuration, the edge part 131 merely contacts with the upper edge of the funnel 103B of the hopper 103, that is, with the upper edge of the opening part 103B1.

Further, in the cover 104 having a barrier property, as shown in FIGS. 21 and 24, perforation or cutting lines (perforation in the example in the figure) serving as six strength weak parts 113 are provided in radial directions from the center toward the edge at approximately regular intervals. The range of providing is set up such as to go through the innermost layer 107. Further, the range may reach the extruded resin film 130 of polyethylene. The perforation or cutting lines serving as the strength weak parts 113 allow the metallic foil layer 110 to be broken easily together with the innermost layer 107 so as to permit easy opening.

Then, as for the feature point of the cover having a barrier property according to the present invention, in particular, in order that unexpected situations that the cover 104 is broken easily at the strength weak parts 113 like in the case of falling of the container should be reduced as far as possible, special design is performed on the manner of providing the perforation or the cutting lines serving as an example of the strength weak parts 113 provided in the cover 104. That is, the perforation or the cutting lines are provided such as not to reach the edge 4A of the cover 104.

As a result of observation of the phenomenon that when fallen, the cover 104 is easily broken starting at the strength weak parts 113, the following fact was found. The occurrence of breakage is caused by the fact that the opening part 102A of the container body 102 is distorted inward by the shock of the drop and hence a force is generated that partly widens the cover 104. Further, as a result of deeper analysis, it has been found that the force generated by the distortion of the opening part 102A so as to widen the cover 104 is concentrated within the range of 40 mm from the opening part 102A of the container body 102 toward the center of the cover 104, especially, within the range from 5 to 20 mm. On the basis of those new findings, the cover 104 was improved in the present invention.

That is, a configuration is obtained that the ends 133 of the strength weak parts 113 are provided inward with a space of 5 to 40 mm from the edge 131 of the cover 104. The example in FIGS. 1 and 4 shows a case that the space L between the ends 133 of the strength weak parts 113 and the edge 131 (the opening part 102A of the container body 102) of the cover 104 is 15 mm.

In the perforation shown in FIGS. 21 and 24, the length of each perforation is set to be 9 mm while the connection is set to be 1 mm. Here, the value three for the number of lines is the minimum requirement for achieving the desired object of the present invention. Further, the upper limit for a preferable value of the number of lines is ten, although this depends on the size of the cover 104. In contrast, the number of lines greater than or equal to 11 causes the concern of weakening the strength of the cover 104, and hence is not preferable. An ideal value is 3 to 10.

In the protection cap 105, the same raw material as that of the container body 102 or alternatively an appropriate resin such as high-density polyethylene (HDPE) and polypropylene whose thickness is set to be approximately 0.8 mm is adopted. As shown in FIGS. 24 and 25, the protection cap 105 is fitted over the opening part 102A of the container body 102 so as to protect the cover 104 and keep the inside hygienic.

Figure 27:
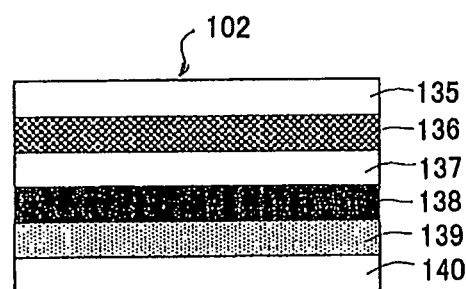
FIG. 27 is an explanation sectional view of a main part that shows a laminate structure of a container body.

Further, specifically, as shown in FIG. 27, the container body 102 used in the fourth embodiment was constructed from a laminated material for paper container having a configuration fabricated by lamination from <container outer side> a printing layer 135/a paper layer 136 (350 g/m²)/an adhesives layer 137 (25 µm) of ethylene methacrylic acid polymerization resin (EMAA)/an aluminum layer 138 (7 µm)/a PET adhesives layer 139 (12 µm)/a low density polyethylene layer 140 (60 µm)<container inner side>.

The work of charging powdered instant coffee P into the refilling use container 101 according to the present invention is performed similarly to the first embodiment described above, in general, via the opening part 103B1 of the hopper 103.

Here, the method of use of the refilling use container 101 having the above-mentioned configuration according to the fourth embodiment is similar to that in the first embodiment described above. Thus, detailed description is omitted here.

As such, the innermost layer 107 of the cover 104 is provided with the sealant layer 108 of polyethylene (linear low density polyethylene: LLDPE). Thus, regardless of the presence of the level difference 106A in the opening part which is specific to a paper cup, even when the opening part of the paper cup is directly sealed by the cover 104, satisfactory sealing has been achieved, and hence satisfactory air tightness has been realized. Further, since hot melt is not adopted, a stable sealing property has been obtained while the influence of odor has been eliminated.

In order to confirm the superiority of the present invention, the following drop resistance test was conducted.

Figure 16:
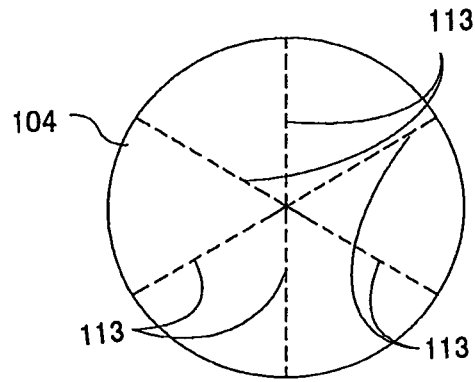
FIG. 16 is a bottom view of a cover in a case that six strength weak parts are employed, in correspondence to FIG. 9.

First, fabricated as test objective articles are: a cover 104 having a structure that the ends 133 of the strength weak parts are contained within a region departed by 15 mm from the edge 131 of the cover 104 toward the center according to the present invention as shown in FIG. 21; and a cover 104 having a comparison example structure that the strength weak parts 113 are provided up to the edge 131 of the cover 104 as shown in FIG. 16. Then, comparative examination for the drop resistance was conducted under the following conditions.

Here, the shapes and the materials of the other member components were identical to each other. That is, the configuration described in the above-mentioned embodiments was adopted.

First, ten samples were fabricated in which contents of 120 µm were contained and then the opening part 102A of the container was sealed by the cover 104 having the structure according to the present invention shown in FIG. 21. Then, five other samples were fabricated in which sealing was performed by the cover 104 having the comparison example structure shown in FIG. 16. In the orientation that the opening part 102A of the container is inclined downward at 45 degrees, five samples having the structure according to the present invention shown in FIG. 21 and the samples having the comparison example structure shown in FIG. 16 were dropped from the position of 60 cm above the ground. Further, the remaining five samples having the structure according to the present invention shown in FIG. 21 were dropped from the position of 100 cm above the ground.

The result is shown in Table 1.

TABLE 1

[Comparative results of drop resistance]

| n-number | a) No perforation margin 60 cm, top face 45degrees, drop | b) Perforation margin: 15 mm 60 cm, top face 45degrees, drop | c) Perforation margin: 15 mm 100 cm, top face 45degrees, drop |
|---|---|---|---|
| 1 | OX | OOOOO | OOX |
| 2 | OOX | OOOOO | OOOOO |
| 3 | OOX | OOOOO | OOOOO |
| 4 | OX | OOOOO | OOOOO |
| 5 | X | OOOOO | OOOOX |

As seen from the test result, first, in the comparison example structure shown in FIG. 16, four samples were resistive against once or twice of drop. Only in one sample, the strength weak parts 113 were broken by once of drop. In contrast, in the structure according to the present invention shown in FIG. 21, in the case of drop from the height of 60 cm above the ground, all five samples were resistive against five times of drop. That is, no breakage occurred in the samples. Further, in the case of drop from the height of 100 cm above the ground, three samples were resistive against five times of drop. Further, one of the remaining two samples was resistive against twice of drop, while the other one was resistive against four times of drop. As such, the desired object has been achieved satisfactorily. This result shows the superiority of the cover 104 according to the present invention in the drop resistance.

(Fifth Embodiment)

Figure 23:
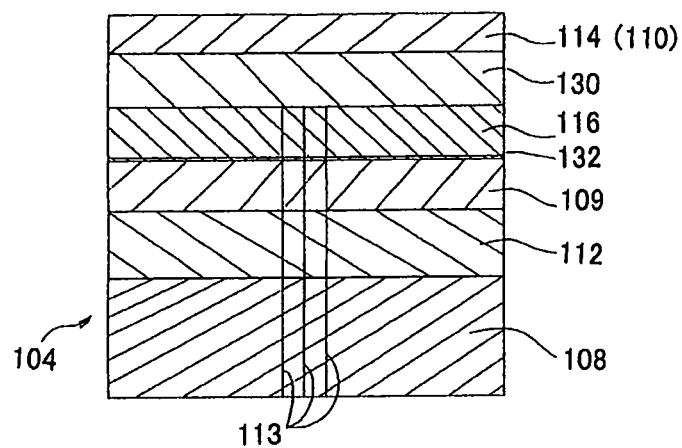
FIG. 23 is a sectional view showing a structure of a cover having a barrier property according to a fifth embodiment of the present invention, in correspondence to FIG. 22.

Next, the structure of a cover having a barrier property according to the fifth embodiment of the present invention is described below with reference to the description in FIG. 23.

Here, like configuration components to the fourth embodiment are designated by like numerals, and hence their detailed description is omitted.

A feature point in the configuration of the fifth embodiment is that in the cover 104, a paper layer 136 is further provided on the upper surface of the polyethylene terephthalate 109 in the innermost layer 107 described in the fourth embodiment. An effect equivalent to that of the fourth embodiment is achieved, while the opening property of the cover is more recognizable.

Specifically, the innermost layer 107 is formed by integrally bonding with adhesives 132 a paper layer 136 onto the upper surface of the polyethylene terephthalate 109 described in the fourth embodiment given above. In the paper layer 136, paper of fine quality having a basis weight of 40 g/m$^2$ is employed. The adhesives 132 are for dry lamination and of two-liquid hardening type of ester-urethane family. Here, the paper of fine quality adopted as the paper layer 136 is appropriately selected from those having a value within the range, preferably, from 15 to 150 g/m$^2$ by basis weight. Then, the paper layer 136 of the innermost layer 107 is bonded onto the lower surface of the aluminum foil 114 via the extruded resin film 130 of polyethylene (low density polyethylene: LDPE), so that a composite sheet is formed.

Further, the perforation or cutting lines serving as the strength weak parts 113 are provided such as to reach the vicinity of the upper surface of the paper layer 136.

Since the paper layer 136 is provided in the middle, when the cover 104 is pressed and broken along the strength weak parts 113, breakage sound occurs in the paper layer 136. This provides more preferable feeling of opening to users. Further, an effect is obtained that the stability of processing during the course of formation of the strength weak parts 113 composed of perforation is improved further.

Figure 26:
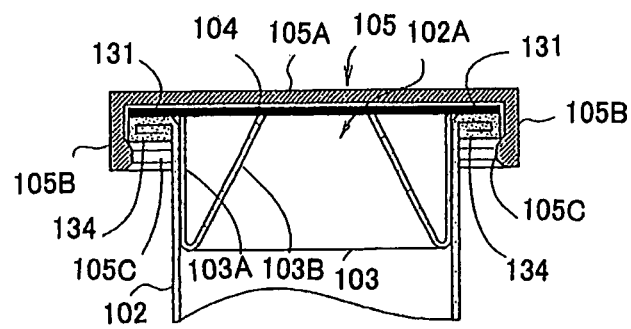
FIG. 26 is a sectional view showing another configuration that indicates relation between a container body, a cover and a protection cap, in correspondence to FIG. 25.

Here, the container body 102 may have a flange 134 extending outward at the upper end of the opening part 102A as shown in FIG. 26. Thus, the edge part 131 of the cover 104 is also bonded appropriately onto the upper end face of the flange 134, in general, by heat seal. Further, numeral 105 in the figure indicates a protection cap. At the lower end of the peripheral wall 105B integrally hanging downward from the surroundings of the top plate 105A, a fitting protrusion 105C for engaging with the surroundings of the lower part of the flange 134 is provided integrally. In the example in the figure, the fitting protrusion 105C is provided continuously along the entire circumference. However, in place of this, although not illustrated, the fitting protrusion 105C may be provided partly in the circumferential direction. Alternatively, three or four pieces of protrusions may be provided in the circumferential direction at regular intervals.

Further, the container body 102 adopted in FIG. 26 is similar to that of the fourth embodiment similar, and has a hopper 103. However, various experiments have shown that even a configuration constructed only from the container body 102 not provided with the hopper 103 and from the cover 104 seldom causes special inconvenient depending on the contents and hence an effect equivalent to that of the fourth embodiment is obtained.

Further, at the upper end of the rising wall 103A described in the fourth and the fifth embodiments, although not illustrated, an outward flange abutting airtightly may be provided at the opening edge of the container body 102. The advantages such as the opening property, the high temperature holding property, the barrier property, the odor, and the feeling of opening of the cover 104 itself according to the fourth embodiment, as well as the stability at the time of forming the strength weak parts 113 and the like, are not degraded completely, and hence an equivalent effect can be obtained.

An aluminum foil is adopted as the barrier material of the cover 104 described in the fourth and the fifth embodiments. However, in place of this, a barrier property film such as an aluminum deposition film, ethylene-vinyl acetate copolymer (EVOH) and polyvinyl alcohol (PVA) may be adopted. Alternatively, a barrier property coating film such as polyvinyl acetate (PVAC) and a polyvinyl alcohol coated film may be adopted.

Further, in the fourth and the fifth embodiments, instant powder coffee is adopted as the contents. However, other powder of food or non-food may be adopted. For example, water-soluble milk (powdered milk), cocoa, tea, or powder of a combination of these may be adopted. Further, dried mashed potato and other dried food, source or gravy powder, and soup powder, as well as toner for a copying machine may be adopted.

Further, in place of the jar 19, the embodiments may be applied to a coffee powder tank of a coffee maker, a toner refilling container of a copying machine, and the like.

The fourth and the fifth embodiments justify the following items 1 to 4 as the scope of protection of the present invention.

1. A cover having open-easiness and a barrier property, wherein: an innermost layer is a layer that contains at least a sealant layer of polyethylene in a lowermost layer; a film layer having a barrier property is bonded onto an outside of the innermost layer via an adhesive layer; and in the innermost layer, a plurality of strength weak parts are provided radially from the center in positions that the tips in the radial direction do not reach the edge of the cover.

2. The cover having a barrier property described in item 1, wherein the strength weak parts are perforation or cutting lines.

3. The cover having a barrier property described in any one of items 1 and 2, wherein the number of the strength week parts is equal to or greater than three and the strength weak parts are provided radially from a center to the edge at the same central angles.

4. The cover having a barrier property described in any one of items 1 to 4, wherein a paper layer is provided in the innermost layer.

<3. Structure of Funnel Component>

Details of the structure of the funnel component are described below in the following sixth embodiment. Here, illustration of the over-cap for protecting the membrane is omitted in the following figures.

(Sixth Embodiment)

Figure 28:
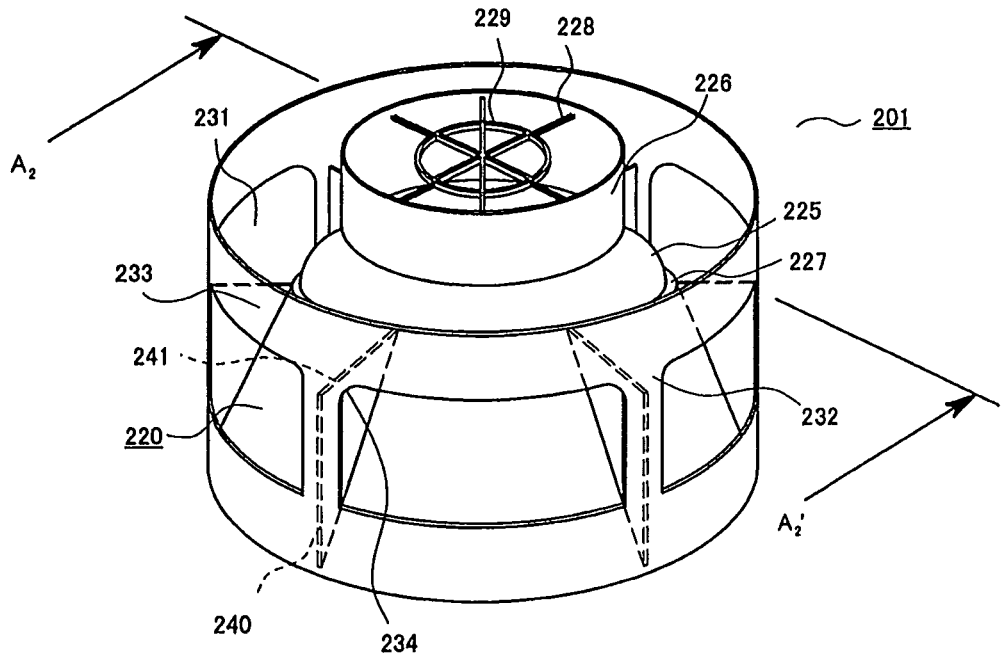
FIG. 28 is a perspective view of a funnel component according to a sixth embodiment of the present invention.
Figure 29:
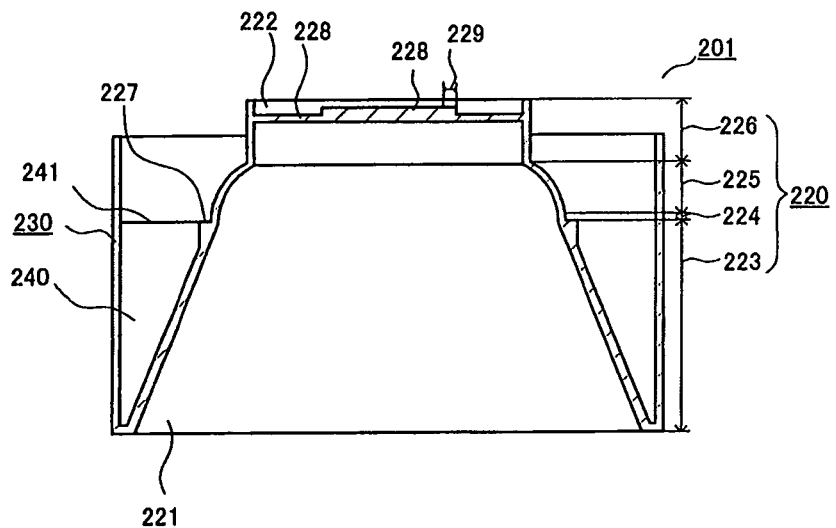
FIG. 29 is a sectional view taken along line $A_2$-$A_2'$ in FIG. 28.
Figure 30:
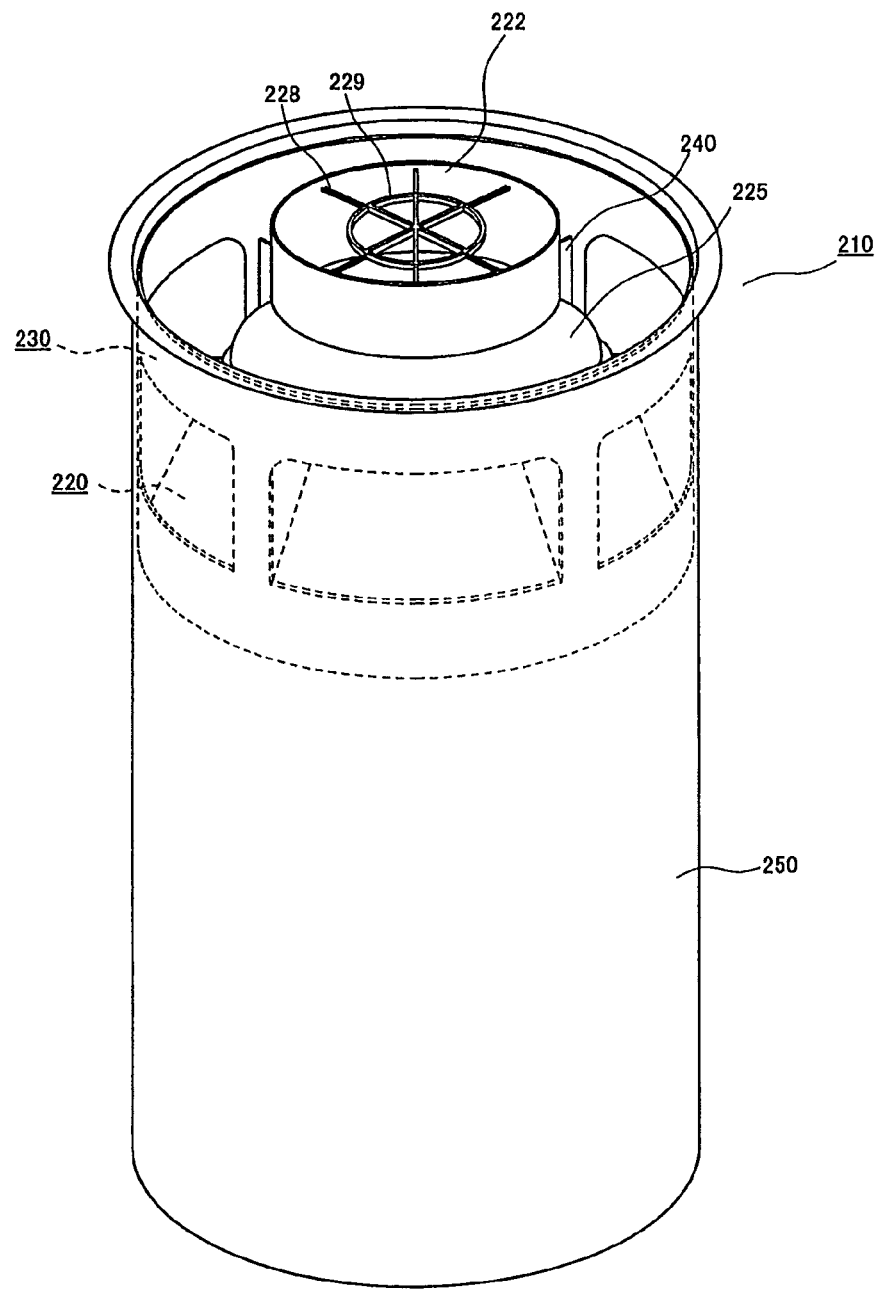
FIG. 30 is a perspective view showing a state that a funnel component shown in FIG. 28 is attached to a container body.

FIG. 28 is a perspective view of a funnel component according to the present embodiment. FIG. 29 is a sectional view taken along line $A_2$-$A_2$' in FIG. 28. FIG. 30 is a perspective view showing a state that a funnel component shown in FIG. 28 is attached to a container body.

The funnel component 201 has: a funnel 220 for guiding contents into a preservation container; ribs 228 provided in the inside of an opening part 222 of the funnel 220; a cylindrical side wall 230 connected to a container body; and six ribs 240 for reinforcing the funnel component 201 and restricting the insertion amount of the preservation container.

The funnel 220 has an opening part 221 on the larger opening side and an opening part 222 on the smaller opening side, and has a shape whose diameter decreases from the opening part 221 toward the opening part 222. More specifically, the funnel 220 has, in order from the larger opening side: a tapered part 223 whose diameter decreases continuously at a fixed ratio; a first straight part 224; a guide part 225 having a shape whose diameter decreases monotonically; and a second straight part 226. Here, in the present specification, an arc shape indicates a circular arc, an elliptic arc or a curved shape composed of a combination of circular arcs and elliptic arcs having mutually different curvatures.

The guide part 225 is provided for guiding the funnel 220 to the center of the opening part of the preservation container at the time of use of a package employing the funnel component 201 (FIGS. 6 and 7). Further, the protruding part 227 is provided for helping closure of the gap between the opening part of the preservation container and the funnel 220 at the time of use of a package employing the funnel component 201 (FIGS. 6 and 7).

The ribs 228 are formed such as to extend radially from the center of the opening part 222 on the smaller opening side and bridge the individual parts of the inner surface of the opening part 222 with each other. The ribs 228 are arranged equally around the center axis of the opening part 222. Thus, the central angle formed by each pair of adjacent ribs 228 and the center axis of the opening part 222 is constant. Further, the size and the positions of the ribs 228 are set up such that the end faces of the ribs 228 on the smaller opening side are located on the larger opening side relative to a plane containing the end face of the opening part 222 of the funnel 220. This comes from the consideration that in a package employing the funnel component 201, overlapping of the ribs 228 with the cutting lines provided in the membrane should be avoided so that breakage of the membrane should be avoided even when an unexpected pressing force acts on the open end part of the container body.

In the inside of the opening part 222 of the funnel 220, a plurality of cross ribs 229 are further provided for connecting adjacent ribs 228 with each other so as to suppress deflection in the ribs 228. In the present embodiment, the cross ribs 229 form a circle concentric to the opening part 222. As shown in FIG. 29, the end faces of the cross ribs 229 on the smaller opening side form the same plane with the end face, on the smaller opening side, of a part of the ribs 228 surrounded by the cross ribs 229. Further, in the present embodiment, the end faces of the cross ribs 229 on the smaller opening side are also located on the larger opening side relative to the end part on the smaller opening side of the opening part 222 of the funnel 220.

The side wall 230 has a cylindrical shape that encloses the funnel 220. Then, opening 231 having a rectangular shape are formed intermittently in the circumferential direction. By forming a plurality of opening 231 in the side wall 230, pillar parts 232 each formed between a pair of adjacent opening 231 and a belt-shaped attaching part 233 connected to the pillar parts 232 and including the end face of the side wall on the smaller opening side of the funnel 220.

Corners 234 of the opening 231 located on the smaller opening side of the funnel 220 are formed in an arc shape.

The ribs 240 are connected to the outer surface of the funnel 220 and the stud part 232 inner surface of the side wall 230, and arranged intermittently in the circumferential direction.

In the funnel component 201 having the above-mentioned configuration, at least any one of resin and paper is adopted as a construction material. In the case of a composite of resin and paper, resin and paper may be integrated by mixing paper into resin, by bonding sheet-shaped materials to each other, or by two-color molding or insert molding.

Figure 31:
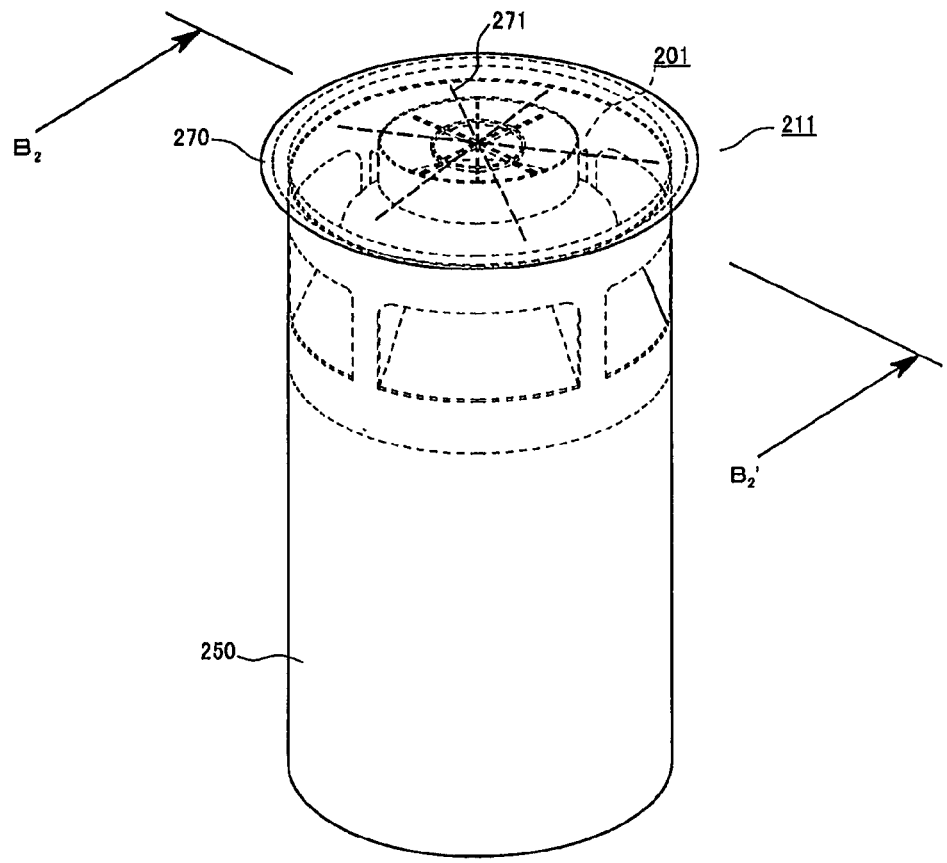
FIG. 31 is a perspective view of a package according to a sixth embodiment.
Figure 32:
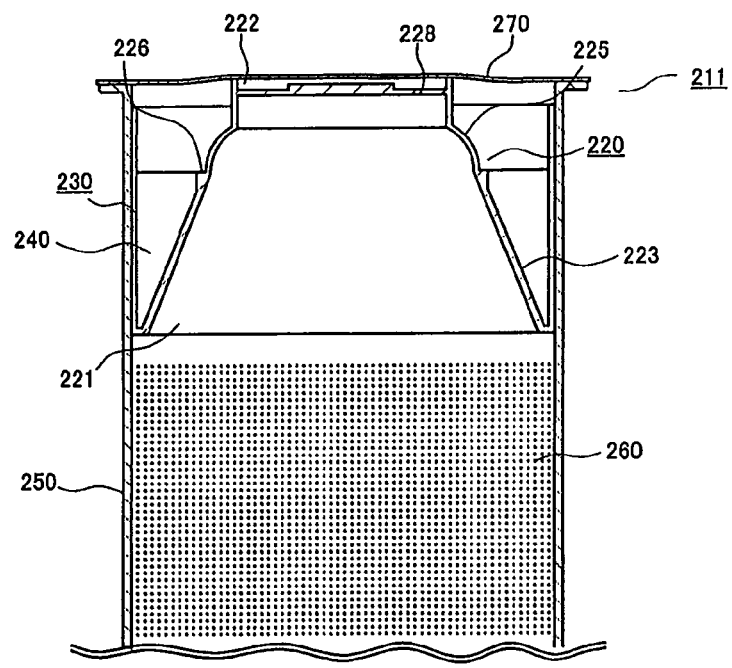
FIG. 32 is a sectional view taken along line $B_2$-$B_2'$ in FIG. 31.

FIG. 31 is a perspective view of a package according to an embodiment of the present invention. FIG. 32 is a sectional view taken along line $B_2$-$B_2$' in FIG. 31.

In the package 211, contents 260 are charged into the container body 250 provided with the funnel component 201, and then the open end of the container body 250 is closed by the membrane 270. Further, the method of use (FIGS. 6 and 7) described above is assumed. Thus, the cutting lines 271 for adjusting the breaking strength are formed in the membrane 270.

Like in the case of dropping of the package 211, when the package 211 side surface collides against the ground surface, a pressing force in the package 211 inside direction acts on the package 211 side surface. This pressing force causes deformation in the open end part of the container body 250. Then, when a tension greater than or equal to a predetermined value acts in a direction crossing the cutting line 271, the membrane 270 may be broken.

In the funnel component 201 according to the present embodiment, bending is suppressed by the ribs 228 described above, the cross ribs 229 connecting these, and the ribs 240 connecting the funnel 220 with the side wall 230. Thus, when the funnel component 201 is attached, the strength of the open end part of the container body 250 is improved so that deformation can be suppressed. This permits prevention of unexpected breakage of the membrane 270 caused by deformation in the container body 250.

Further, the plane containing the end faces of the ribs 228 located on the smaller opening side and the end faces of the cross ribs 229 located on the smaller opening side is located on the larger opening side relative to the plane containing the opening part 222 on the smaller opening side. This permits prevention of direct damage to the membrane 270 caused by collision of the membrane 270 against the ribs 228 or the cross ribs 229.

Here, FIGS. 28 to 32 show an example that the cross ribs 229 for preventing the bending of the ribs 228 are provided in the inside of the opening part 222. However, the configuration shown in FIG. 33 may be adopted.

Figure 33:
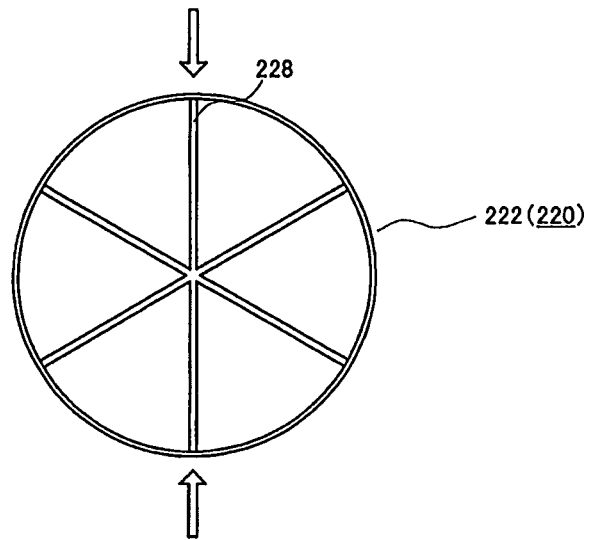
FIG. 33 is a plan view showing another example of ribs provided in the inside of an opening part on the smaller opening side of a funnel.

FIG. 33 is a plan view showing another example of the ribs 228 provided in the inside of an opening part on the smaller opening side of a funnel.

In the example of FIG. 33, a plurality of ribs 228 extending radially from the center of the opening part 222 are provided alone in the inside of the opening part of the funnel 220 on the smaller opening side. When a pressing force is applied on the funnel 220 in the arrow direction in the figure, the center part of the ribs 228 that receives this pressing force bends easily. However, when the diameter of the opening part 222 on the smaller opening side is relatively small, the bending of the ribs 228 is also small. Thus, the reinforcing effect of the opening part 222 on the smaller opening side can sufficiently be expressed. Accordingly, even when the funnel component 201 provided with the ribs 228 shown in FIG. 33 is employed, the deformation in the open end part of the container body can be suppressed, and hence breakage of the membrane can be prevented.

Here, in the sixth embodiment, the funnel includes: a tapered part; first and second straight parts; and a guide part. However, the shape of the funnel is not limited to a particular one as long as the shape permits guiding of contents from the larger opening side to the smaller opening side. For example, a funnel having no straight part and having only a tapered part and a guide part may be constructed. Alternatively, a funnel having an additional straight part in the middle of a tapered part may be constructed. Further, the protruding part of the funnel outer surface is arbitrary, and hence need not necessarily be provide.

Further, in the sixth embodiment, it is sufficient that the ribs provided in the inside of the funnel on the smaller opening side have a shape that suppresses deformation in the funnel on the smaller opening side and still does not prevent excessively the passage of the contents. The cross sectional shape of the ribs is also not limited to a particular one. That is, an arbitrary cross sectional shape such as a rectangle and a circle may be adopted. Further, the shape may be such as to form a curve from the center of the opening part on the smaller opening side. As for the number of ribs, it is sufficient that two or more ribs are employed. Further, it is preferable that the ribs are provided equally in the circumferential direction. However, unequal arrangement may be employed so that the central angles formed by adjacent ribs may be different from each other.

The shape of the cross ribs for connecting the ribs to each other is not necessarily a circle. For example, a polygon formed when cross ribs each having a straight shape connect adjacent ribs to each other may be employed. Further, the end faces located on the funnel smaller opening side of the cross ribs may not be located on the same plane.

Further, in the sixth embodiment, the opening part provided in the side wall may extend to the border between the side wall and the funnel larger opening so that the side wall lower part may be omitted. Further, the number of opening parts is arbitrary as long as being a plural number. Further, the opening parts need not be formed at equal intervals in the circumferential direction.

Further, in the sixth embodiment, it is arbitrary whether the ribs connected between the side wall and the funnel are to be provided.

<4. Structure of Cap(Over-Cap)>

In the following seventh and eighth embodiments, details of the structure of a cap (over-cap) are described below.

(Seventh Embodiment)

Figure 34:
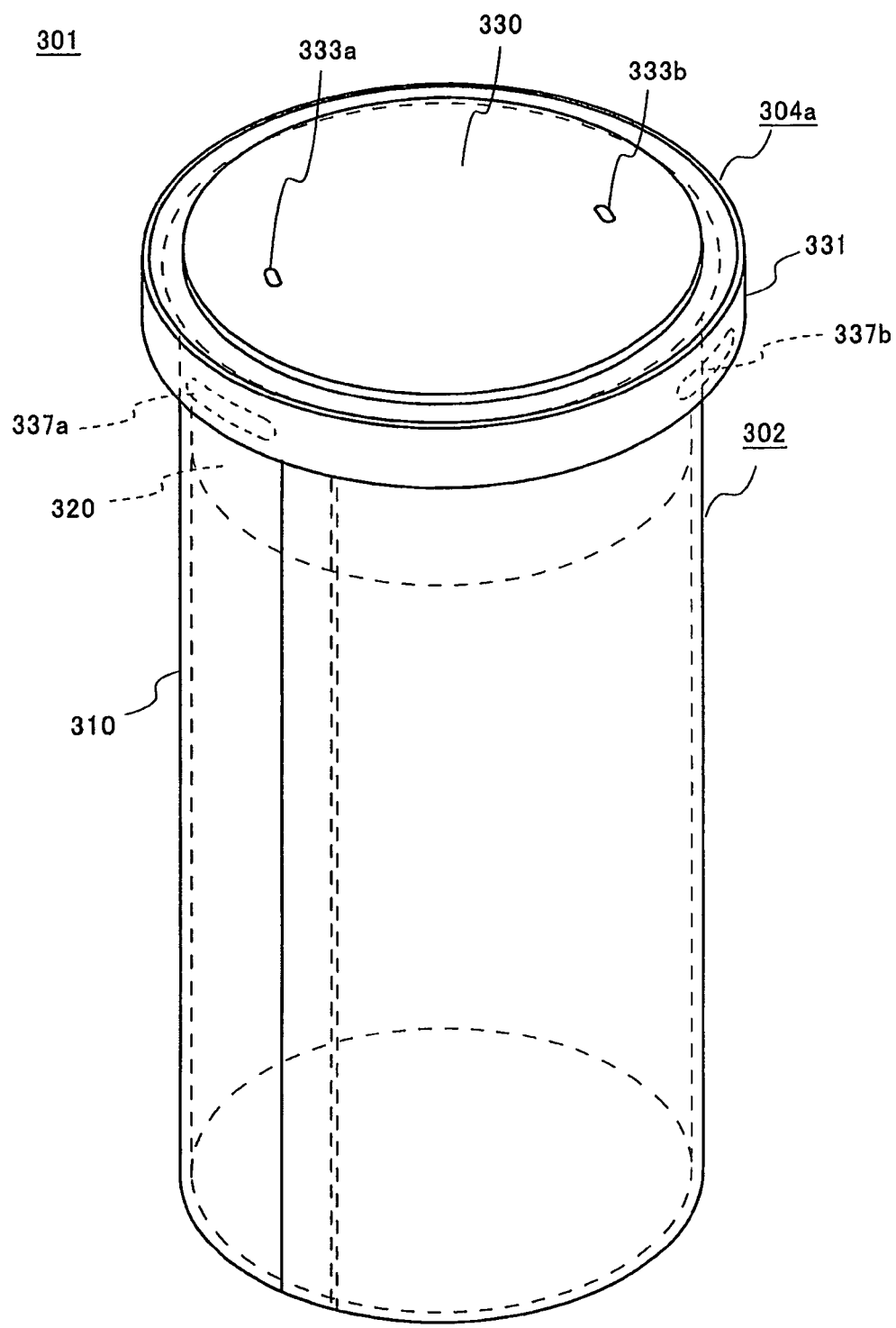
FIG. 34 is a perspective view of a package having a cap according to a seventh embodiment of the present invention.
Figure 35:
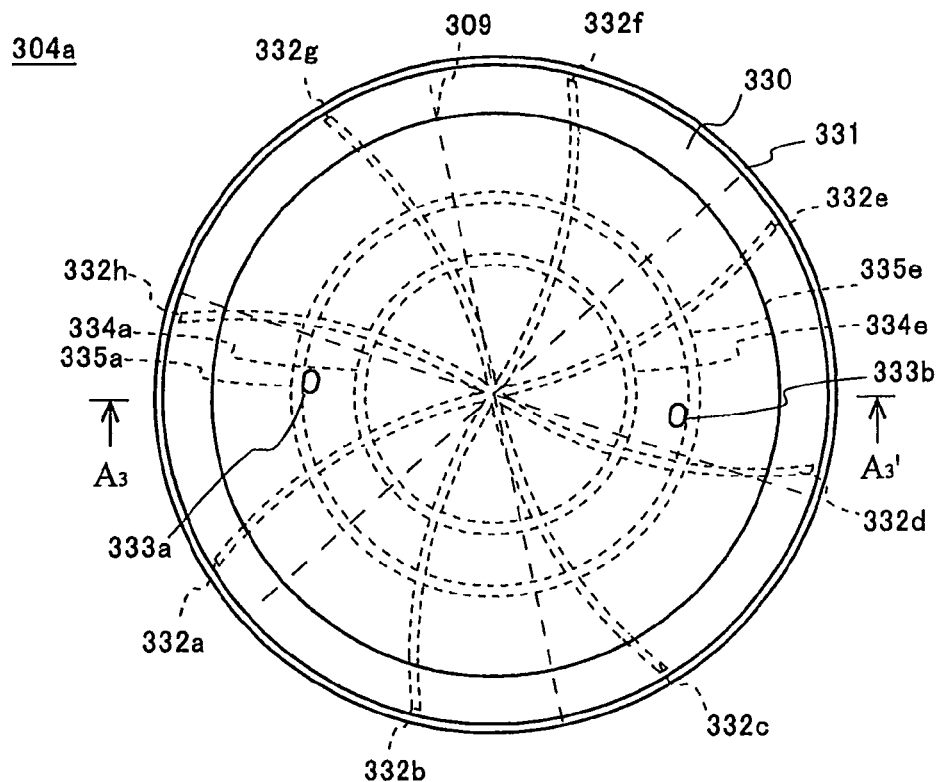
FIG. 35 is a top view of a package shown in FIG. 34.
Figure 36:
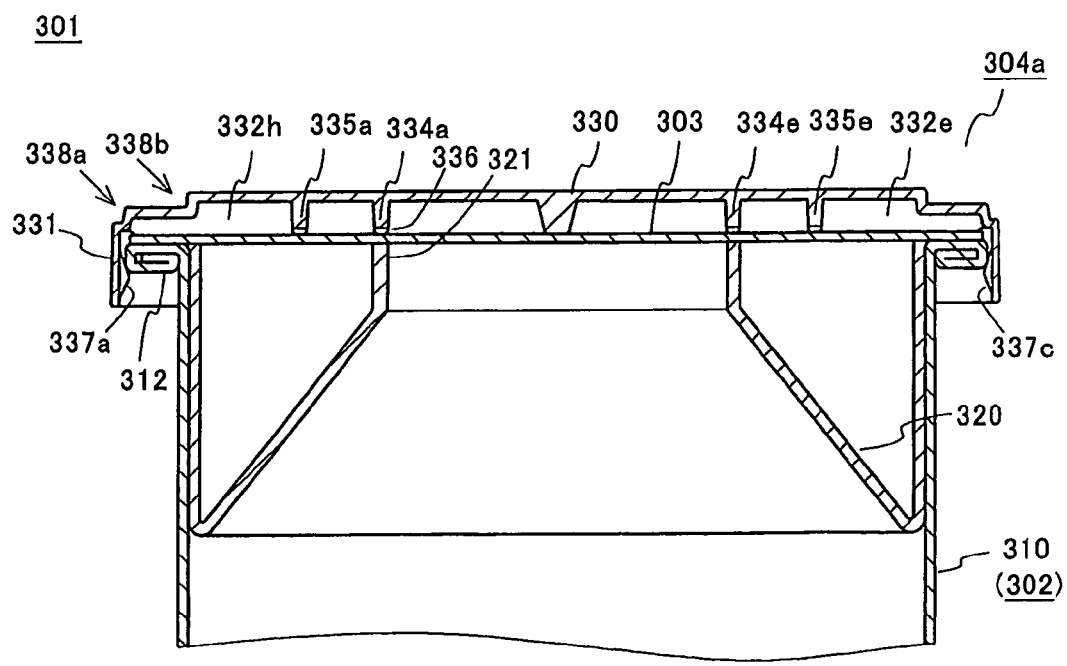
FIG. 36 is a sectional view taken along line $A_3$-$A_3'$ in FIG. 35.
Figure 37:
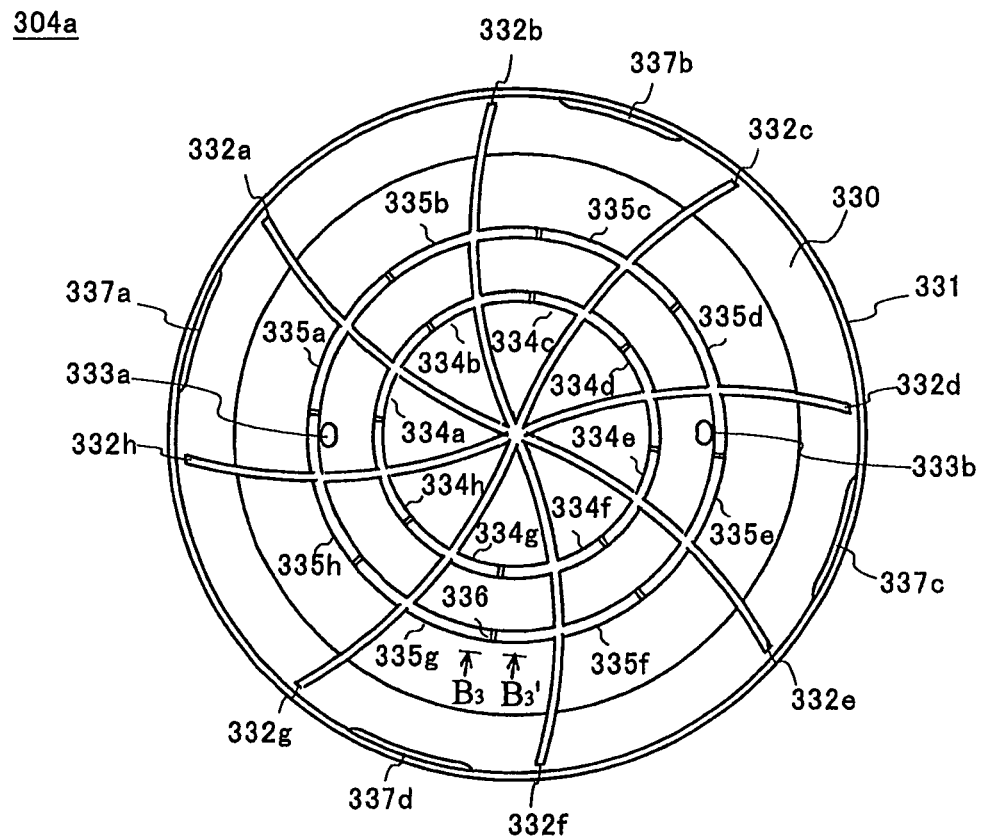
FIG. 37 is a rear view of a cap shown in FIG. 34.

FIG. 34 is a perspective view of a package having a cap according to a seventh embodiment of the present invention. FIG. 35 is a top view of a package shown in FIG. 34. FIG. 35 is a sectional view taken along line $A_3$-$A_3'$ in FIG. 34. Further, FIG. 36 is a rear view of a cap shown in FIG. 34. FIG. 37 is a sectional view taken along line $B_3$-$B_3'$ in FIG. 36.

The cap 304a is provided for protecting the membrane 303 that seals the open end of the container 302 having the above-mentioned configuration, and is formed, for example, by injection molding of resin. Specifically, the cap 304a according to the present embodiment has: a top plate 330 having a plate shape; an annular side wall 331 connected to the outer edge of the top plate 330; protrusions 337a to 337d protruding from the inner surface of the side wall 331; a plurality of radial ribs 332a to 332h formed in one face of the top plate 330; and a plurality of cross ribs 334a to 334h and 335a to 335h for connecting adjacent ribs.

The top plate 303 has a circular shape corresponding to the open end of the container body 310, and is arranged such that the inner surface opposes the membrane 303. Further, as shown in FIG. 36, the vicinity of the outer edge of the outer surface of the top plate 330 is formed into a step so that a level difference 338a located on the outer edge and a level difference 338b located in the inner periphery relative to the level difference 338a are provided. The level difference 338a is provided for easiness of stacking of the cap 304a before attaching to the package. The level difference 338b is provided for easiness of stacking of the package 301 in which the cap 304a has been attached to the container 302. Further, in the top plate 330, holes 333a and 333b are formed for releasing air from a space formed between the cap 304a and the membrane 303.

The side wall 331 is formed such as to rise from the outer edge of the top plate 330 in a direction perpendicular to the top plate 330. The protrusions 337a to 337d provided in the side wall 331 inner surface are arranged intermittently in the extending direction of the side wall 331 (that is, in the circumferential direction of the top plate 330). In a state that the cap 304a is attached to the container 302, as shown in FIG. 36, the open end part of the container body 310 is fitted inside the side wall 331. More specifically, the protrusions 337a to 337d engage with the flange 312 of the container body 302 in a state that the flange 312 of the container body 310 is pinched between the protrusion 337a to 337d and the ribs 334a to 334h described later, and thereby maintain the attachment state to the container body 310 of the cap 304a.

The radial ribs 332a to 332h are provided in the inner surface of the top plate 330, and extend radially in the shape of a gradual arc from the center of the top plate 330 toward the side wall 331. As shown in FIGS. 36 and 37, the outer ends of the radial ribs 332a to 332h are not connected to the inner surface of the side wall 331.

The cross rib 334a is provided on the inner surface of the top plate 330, and connects a pair of adjacent radial ribs 332a and 332h. Similarly, each of the other cross ribs 332b to 332h connects the corresponding pair of radial ribs. These cross ribs 334a to 334h form first circular ribs coaxial to the opening part 321 on the smaller opening side of the funnel 320 and having the same diameter. Further, in the outside of the cross ribs 334a to 334h, a plurality of cross ribs 335a to 335h are provided that connect a pair of adjacent radial ribs so as to form second circular ribs concentric to the circle formed by the cross ribs 334a to 334h.

Figure 38:
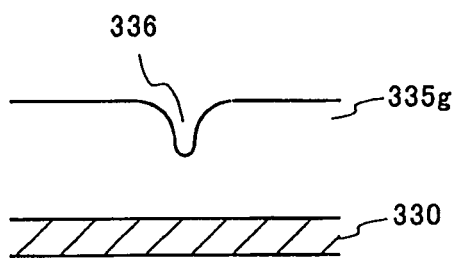
FIG. 38 is a sectional view taken along line $B_3$-$B_3'$ in FIG. 37.

The height values of the radial ribs 332a to 332h and the cross ribs 334a to 334h and 335a to 335h measured from the top plate 330 inner surface are set up such that the individual end faces (the surfaces directed to the membrane 303) form the same plane. Further, in the end faces of the cross ribs 334a to 334h and 335a to 335h, a notch 336 is formed as shown in FIG. 38. The notch 336 serves as an air passage for connecting partitions formed by the radial ribs 332a to 332h and the cross ribs 334a to 334h and 335a to 335h.

In the package 301 according to the present invention, the method of use (FIGS. 6 and 7) described above is assumed. Thus, the cutting lines 309 (FIG. 9) for adjusting the breaking strength are formed in the membrane 303. Thus, when the open end part of the container body 310 sealed by the membrane 303 is deformed greatly so that a tension greater than or equal to a predetermined value acts in a direction crossing the cutting line 309, the membrane 303 can be broken. In the cap 304a having the above-mentioned configuration, rigidity against bending and torsion is improved by virtue of the radial ribs 332a to 332h and the cross ribs 334a to 334h and 335a to 335h. Thus, when the cap 304a is attached to the container 302, deformation at the open end of the container body 310 can be suppressed. Thus, according to the cap 304a of the present embodiment, the surface is covered by the cap so that direct damage to the membrane 303 is prevented. In addition, unexpected breakage can be prevented that is caused by deformation in the container body 310.

Further, in a state that the cap 304a is attached to the container 302, as shown in FIG. 36, the membrane 303 contacts with the surface formed by the radial ribs 332a to 332h and the cross ribs 334a to 334h and 335a to 335h. Thus, even when a pressing force is applied on the top plate 330 of the cap 304a, the pressing force is transferred to the membrane 303 in a dispersed form. This prevents the breakage of the membrane 303 caused when the pressing force is concentrated onto a single part.

In particular, in the cap 304a according to the present embodiment, the cross ribs 334a to 334h form a circle coaxial to the opening part 321 on the smaller opening side of the funnel 320 and having the same diameter. Thus, as shown in FIG. 36, the end faces of the cross ribs 334a to 334h abut against the opening part 321 of the funnel 320 via the membrane 303. When a pressing force is applied on the top plate 330, a part nearer to the center bends more easily. However, the radial ribs 332a to 332h suppress the bending. Further, the funnel 320 welded to the container body 310 prevents the bending of the top plate 330. Thus, breakage of the center part of the membrane 303 is prevented more effectively. Further, when the membrane 303 is pinched between the cross ribs 334a to 334h and the opening part 321 in a close contact state, a situation is avoided that the contents of the container 302 move around to the outer surface side of the funnel 320 through the opening part 321.

As shown in FIG. 35, the radial ribs 332a to 332h have a curved shape. Thus, the cutting lines 309 having a straight shape provided in the membrane 303 do not completely overlap with the radial ribs 332a to 332h. Further, the intersecting portion is minimized. This prevents breakage of the membrane 303 occurring when a pressing force having a relatively low strength is applied from the ribs 302a to 302h onto a cutting line 309. In particular, in the present embodiment, the number of cutting lines 309 formed in the membrane 303 is different from the number of radial ribs 332a to 332h. This configuration permits avoidance of a situation that the break lines 309 of the membrane 303 coincide with the radial ribs 332a to 332h. Thus, a situation can be prevented more effectively that the cutting lines 309 are broken unintentionally when a shock is applied on the cap 304a.

Further, the outer ends of the radial ribs 332a to 332h outer end part and the inner surface of the side wall 331 is disconnected. Thus, bending of the side wall 331 is permitted to a certain extent. According to this configuration, even when a strong shock is applied on the side wall 331 part at the time of drop of the package 301 provided with the cap 304a, instead of that both of the side wall 331 and the top plate 330 are deformed, the side wall 331 alone cab be bent so as to alleviate the shock. Thus, breakage of the membrane 303 at the time of drop of the package 301 or the like is also prevented. In the present embodiment, as shown in FIGS. 34 and 37, the protrusions 337a to 337d that engage with the flange 312 are arranged intermittently. Thus, a part not provided with a protrusion in the side wall 331 has a high degree of freedom of bending. Thus, the breakage preventive effect at the time of drop is improved further.

In the cap 304a according to the present embodiment, the holes 333a and 333b are provided in the top plate 330, while the notches 336 are provided in the end faces of the cross ribs 334a to 334h and 335a to 335h. Thus, an air releasing passage is ensured between the partitions formed in the inner surface of the top plate 330 and between the inside and the outside of the cap 304a. If such an air passage is not provided, a possibility arises that when a pressing force or a shock acts on the cap, air compressed between the cap and the membrane 303 breaks the membrane 303. In the cap 304a according to the present embodiment, an air passage is provided, and hence this possibility is avoided.

In addition to the above-mentioned breakage preventive effect after attachment, in the cap 304a according to the present embodiment, breakage of the membrane 303 possibly occurring at the time of attachment of the cap 304a to the container 302 can also be prevented as describes below.

At the time of attachment of the cap 304a to the container 302, with expanding the side wall 331, the flange 312 of the container body 310 is fitted into the side wall 331. In this process, air between the cap 304a and the membrane 303 is released outside through the holes 333a and 333b of the top plate 330 and the gaps formed between the protrusions 337a to 337d of the side wall 331 inner surface. This avoids a possibility that at the time of attachment of the cap 304a, the air compressed between the cap 304a and the membrane 303 breaks the membrane 303.

Further, the outer end parts of the radial ribs 332a to 332h are separated from the inner surface of the side wall 331. Thus, at the time of fitting-in of the flange 312, the side wall 331 can easily be expanded. As a result, deformation in the container body 310 to be fitted in is reduced. This prevents a situation that at the time of attachment of the cap 304a, the container body 310 is deformed so as to break the membrane 303.

Further, the protrusions 337a to 337d that engage with the flange 312 are provided partly rather than in the entire circumference of the side wall 331. This reduces the force necessary for attaching the cap 304a. This also avoids deformation in the container body 310 and resulting breakage of the membrane 303.

As described above, according to the present embodiment, the cap 304a can be realized that stably protects the membrane at each of the time of fabrication of the package 301 and the time after the fabrication. Further, the cap 304a according to the present embodiment can be molded with a minimum amount of resin. This provides an advantage also from the perspective of resource saving.

(Eighth Embodiment)

Figure 39:
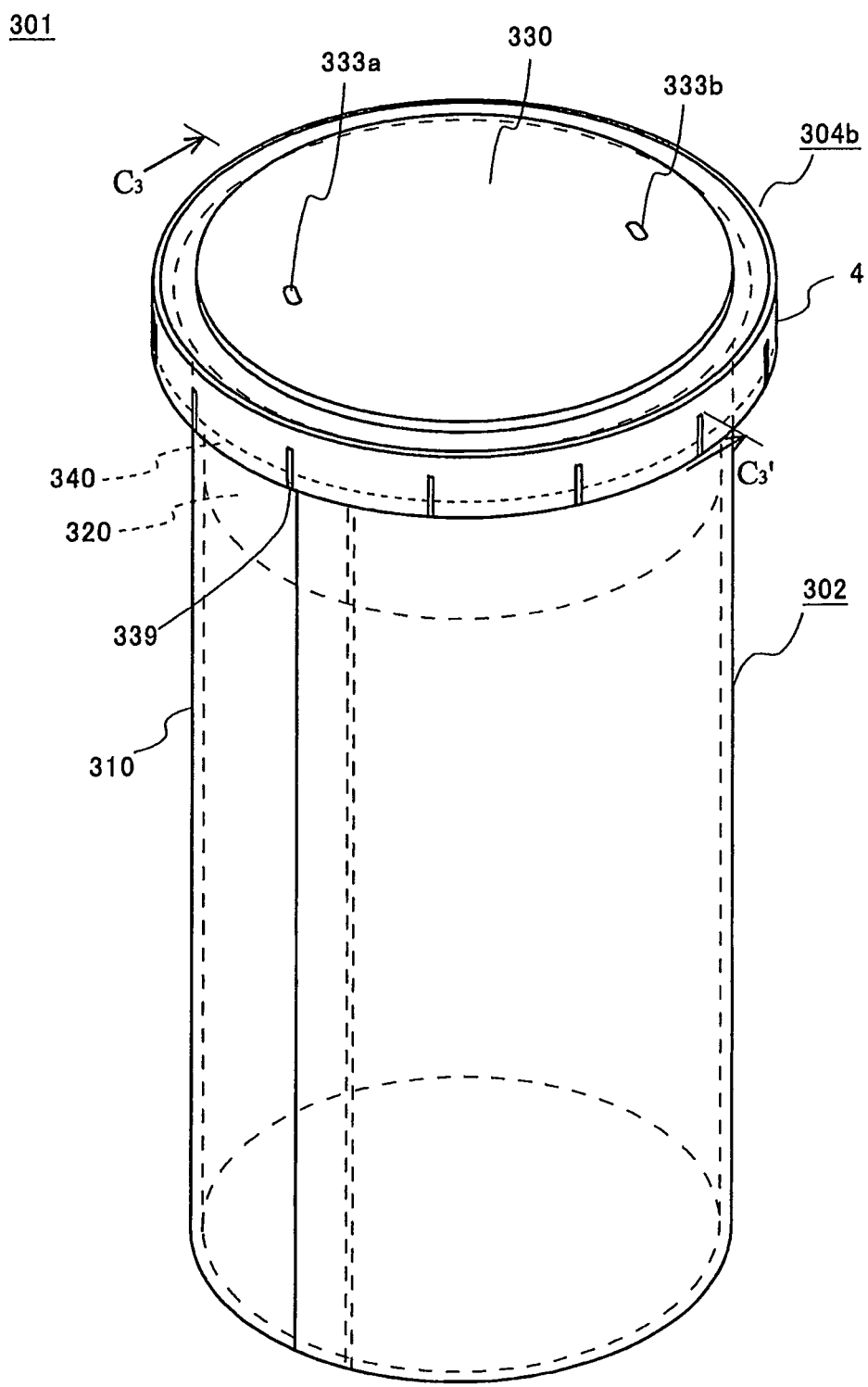
FIG. 39 is a perspective view of a package having a cap according to an eighth embodiment of the present invention.
Figure 40:
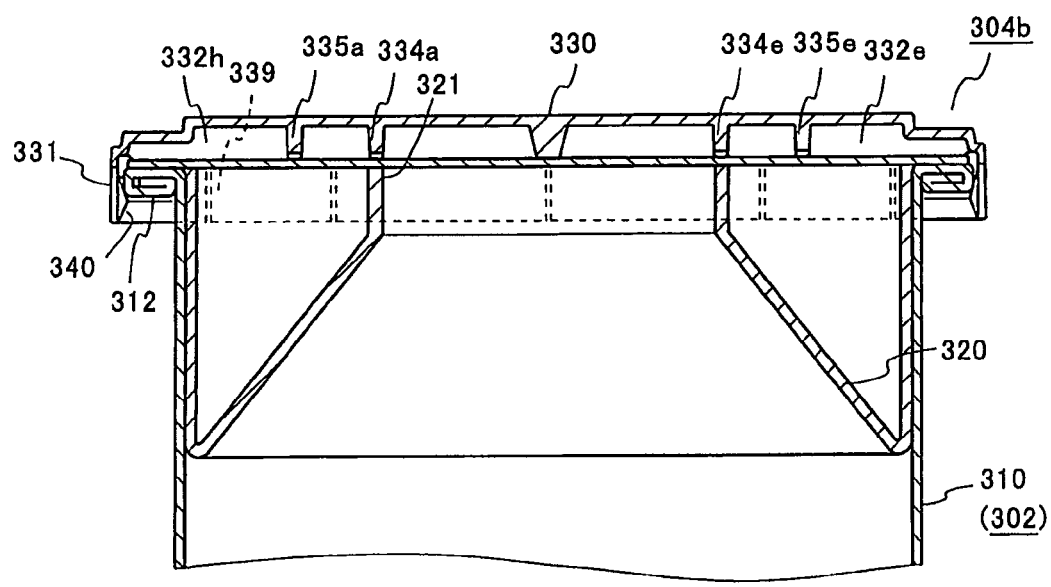
FIG. 40 is a sectional view taken along line $C_3$-$C_3'$ in FIG. 39.

FIG. 39 is a perspective view of a package having a cap according to an eighth embodiment of the present invention. FIG. 40 is a sectional view taken along line $C_3$-$C_3'$ in FIG. 39.

The basic configuration of the cap 304b according to the present embodiment is the same as that of the cap 304a according to the seventh embodiment. Thus, the following description is given with focusing attention on the difference between the present embodiment and the seventh embodiment.

In the present embodiment, a plurality of slits 339 are formed in the side wall 331. Further, in the inner surface of the side wall 331, a protrusion 340 is provided in the entire circumference of the side wall 331 except for the part where the slits 339 are formed.

When the slits 339 are formed as described above, the degree of freedom of deformation in the side wall 331 is improved. Thus, the side wall 331 bends at the time of drop of the package 301 so as to alleviate the shock. This suppresses deformation in the container body 310 and resulting breakage of the membrane 303.

Further, the slits 339 can reduce the force necessary for inserting the cap 304a. Thus, deformation in the container body 310 at the time of attachment of the cap 304a and resulting breakage of the membrane 303 can also be prevented.

(Other Modifications)

Here, in each of the seventh and the eighth embodiments, the cross ribs are provided in the inner surface of the top plate. However, a cap not provided with cross ribs may be constructed depending on the construction material, the strength, and the size of the top plate and the membrane.

Further, in each of the seventh and the eighth embodiments, the plurality of cross ribs form a circle coaxial to the opening part on the smaller opening side of the funnel and having the same diameter. However, this configuration is not an absolute requirement. That is, a plurality of cross ribs may be arranged discontinuously or alternatively in the form of a polygon. Further, the number of cross ribs is not limited to a particular value, and may be arbitrary depending on the necessary strength of the cap and the like.

Further, in each of the seventh and the eighth embodiments, in addition to the notches provided in the end faces of the cross ribs, notches may be formed in the end faces of the radial ribs. Alternatively, in place of the notches provided in the end faces of the cross ribs, notches may be provided only in the end faces of the radial ribs.

Further, in each of the seventh and the eighth embodiments, in place of the notches provided in the end faces of the cross ribs, holes may be provided in the top plate of the partitions closed by the radial ribs and the cross ribs.

Further, each of the seventh and the eighth embodiments has been described for a case that the radial ribs are formed in an arc shape while the cutting lines of the membrane are formed in a straight shape. However, the shapes of the radial ribs and the cutting lines are not limited to particular ones. However, from the perspective of prevention of breakage of the membrane as described above, shapes are preferable that the radial ribs and the cutting lines do not coincide with each other.

Further, slits described in the eighth embodiment may be formed in the side wall of the cap according to the seventh embodiment described above. Alternatively, protrusions of the side wall inner surface of the cap according to the eighth embodiment described above may be provide intermittently in the circumferential direction as in the seventh embodiment.

The seventh and the eighth embodiments justify the following items 1 to 10 as the scope of protection of the present invention.

1. A cap that is attached in an attachable and detachable manner to a package, the package comprising: a container body of tubular shape having an open end; a funnel fitted in the inside of the container body in a state that an opening part on a smaller opening side is directed to the open end; and a membrane which closes the open end of the container body and which is provided with a plurality of cutting lines extending radially from a center and is broken by a pressing force from the outside, and the cap being for protecting the membrane, wherein the cap comprises:

a top plate arranged such that one face opposes the membrane;

an annular side wall which is connected to the outer edge of the top plate and into which the open end of the container body is fitted; and a plurality of radial ribs provided in the one face of the top plate and extending radially from the center of the top plate.

2. The cap described in item 1, wherein the radial ribs extend such as not to coincide with the breakage lines provided in the membrane.

3. The cap described in item 1 or 2, wherein the radial ribs and the side wall are disconnected from each other.

4. The cap described in any one of items 1 to 3, further comprising a plurality of cross ribs for connecting a pair of adjacent radial ribs.

5. The cap described in item 4, wherein:

the opening part on the smaller opening side of the funnel is contact with the membrane;

the end faces of the ribs and the cross ribs form the same plane which is in contact with the membrane; and the plurality of cross ribs form a circle concentric to the opening part on the smaller opening side of the funnel and having the same diameter.

6. The cap described in item 4 or 5, wherein:

the end faces of the radial ribs and the cross ribs form the same plane which is in contact with the membrane; and notches are formed in the end faces of the cross ribs.

7. The cap described in any one of items 1 to 6, wherein a hole is formed in the top plate.

8. The cap described in any one of items 1 to 7, wherein:

a flange is provided at the open end of the container body; and the cap further comprises a plurality of protrusions that protrude from the inner surface of the side wall and are arranged intermittently in an extending direction of the side wall and that engage with the flange.

9. The cap described in any one of items 1 to 8, a plurality of slits are formed on the side wall.

10. A package for transferring contents into another container, comprising:

a container body of tubular shape having an open end;

a funnel accommodated in the inside of the container body in a state that an opening part on a smaller opening side is directed to the open end;

material of powdered, granular, or liquid form charged into the container body;

a membrane that closes the open end of the container body and that is provided with a plurality of cutting lines extending radially from a center and is broken by a pressing force from the outside; and a cap described in any one of items 1 to 9, attached such as to cover the membrane.

Industrial Applicability

The present invention is applicable to a container and a package used for transferring, into a preservation container, powdery, granular or liquid material having fluidity like food such as freeze-dry coffee and powdered milk and toner for copying machine and laser beam printer.

Description of the Reference Characters

| | |
|---|---|
| 1 | Package |
| 2 | Container |
| 3 | Membrane |
| 5 | Powder |
| 7 | Container |
| 8 | Funnel component |
| 10 | Container body |
| 11 | Open end |
| 17 | Side wall |
| 20 | Funnel |
| 101 | Refilling use container |
| 102 | Container body |
| 102A | Opening part |
| 103 | Hopper |
| 104 | Cover |
| 104A | Lower layer part |
| 104B | Upper layer part |
| 105 | Protection cap |
| 106 | Curled part |
| 106A | Level difference |
| 107 | Innermost layer |
| 108 | Sealant layer |
| 110 | Metallic foil layer |
| 111 | Outside layer |
| 113 | Strength weak part |
| 114 | Aluminum foil |
| 118 | Release agent layer |
| 118A | Releasing surface |
| 119 | Jar |
| 130 | Adhesive layer |
| 131 | Edge |
| 133 | End |
| 136 | Paper layer |
| 201 | Funnel component |
| 210 | Container |
| 211 | Package |
| 220 | Funnel |
| 221, 222 | Opening part |
| 223 | Tapered part |
| 224 | First straight part |
| 225 | Guide part |
| 226 | Second straight part |
| 227 | Protruding part |
| 228 | Rib |
| 229 | Link |
| 230 | Side wall |
| 231 | Opening |
| 232 | pillar part |
| 233 | Attaching part |
| 234 | Corner |
| 240 | Rib |
| 241 | Rib end face |
| 250 | Container body |
| 260 | Contents |
| 270 | Membrane |
| 301 | Package |
| 302 | Container |
| 303 | Membrane |
| 304 | Cap |
| 309 | Cutting line |
| 310 | Container body |
| 312 | Flange |
| 320 | Funnel |
| 321 | Opening part |
| 330 | Top plate |
| 331 | Side wall |
| 332a-332h | Radial ribs |
| 334a-334h | Cross ribs |
| 335a-335h | Cross ribs |
| 336 | Notch |
| 337a-337d | Protrusions |
| 339 | Slit |
| 340 | Protrusion |

The invention claimed is:

1. A container for packing material of powdered, granular, or liquid form and transferring the material into a preservation container, the container comprising:
a container body of tubular shape having an open end and a bottom part; and
a funnel component that is fitted in the container body, the funnel component including a funnel whose diameter decreases from a larger opening side toward a smaller opening side and a plurality of ribs that extend radially from a center of an opening part on the smaller opening side of the funnel and that bridge a part with another part of an inner surface of the opening part on the smaller opening side, wherein
an entirety of an upper end part of the opening part on the smaller opening side of the funnel is located on a first plane, and an entirety of upper end parts on the smaller opening side of the ribs is separated from the first plane by a predetermined distance in a direction of the larger opening side, and
an entire space between the upper end parts on the smaller opening side of the ribs and the first plane is void.

2. The container as claimed in claim 1, wherein a pair of adjacent ribs form a constant central angle.

3. The container as claimed in claim 1, further comprising a plurality of cross ribs for connecting a pair of adjacent ribs with each other.

4. The container as claimed in claim 3, wherein the plurality of cross ribs form a circle concentric to the opening part on the smaller opening side of the funnel.

5. The container as claimed in claim 4, wherein an entirety of upper end parts on the smaller opening side of the plurality of cross ribs is located on a second plane.

6. The container as claimed in claim 4, wherein an entirety of upper end parts on the smaller opening side of the plurality of cross ribs and an entirety of upper end parts, on the smaller opening side, of a part of the ribs contained in the circle formed by the plurality of cross ribs are located on a second plane.

7. A package, comprising:
the container as claimed in claim 1;
material of powdered, granular, or liquid form charged into the container body; and
a membrane that seals the open end of the container body and that is broken by a pressing force from the outside.

* * * * *